(12) United States Patent
Ohkuma

(10) Patent No.: US 7,806,605 B2
(45) Date of Patent: Oct. 5, 2010

(54) LIGHT AMOUNT ADJUSTMENT APPARATUS AND IMAGE PICKUP APPARATUS

(75) Inventor: Hideo Ohkuma, Tokyo (JP)

(73) Assignee: Sony Corporation (JP)

( * ) Notice: Subject to any disclaimer, the term of this patent is extended or adjusted under 35 U.S.C. 154(b) by 180 days.

(21) Appl. No.: 12/009,115

(22) Filed: Jan. 16, 2008

(65) Prior Publication Data

US 2008/0175584 A1 Jul. 24, 2008

(30) Foreign Application Priority Data

Jan. 18, 2007 (JP) ............................ P2007-009443

(51) Int. Cl.
- G03B 9/08 (2006.01)
- G03B 9/20 (2006.01)
- G03B 9/26 (2006.01)
- G02B 26/02 (2006.01)

(52) U.S. Cl. .................... 396/469; 396/494; 396/497; 359/234

(58) Field of Classification Search ................. 396/458, 396/241, 506, 452, 457, 463, 469, 484, 486, 396/487, 490, 493, 510, 494, 497; 310/35, 310/46, 49 R, 154.02, 194, 208, 254, 259, 310/261, 261.1; 359/589, 722, 723, 234

See application file for complete search history.

(56) References Cited

U.S. PATENT DOCUMENTS 6,767,145 B2 7/2004 Eguro

2005/0152691 A1* 7/2005 Kawauchi et al. ........... 396/463
2006/0008270 A1* 1/2006 Naganuma .................. 396/469

FOREIGN PATENT DOCUMENTS

| JP | 8-334809 A | 12/1996 |
|---|---|---|
| JP | 2002-182263 A | 6/2002 |
| JP | 2002-365693 A | 12/2002 |
| JP | 2003-005251 A | 1/2003 |
| JP | 2004-095703 A | 3/2004 |
| JP | 2004-309531 A | 11/2004 |
| JP | 2004-354846 A | 12/2004 |
| JP | 2004-354860 A | 12/2004 |
| JP | 2005-091656 A | 4/2005 |
| JP | 2005-110358 A | 4/2005 |
| JP | 2005-345583 A | 12/2005 |
| JP | 2006-171545 A | 6/2006 |
| JP | 2006-215323 A | 8/2006 |
| JP | 2006-284770 A | 10/2006 |

* cited by examiner

Primary Examiner—Rochelle-Ann J Blackman
(74) Attorney, Agent, or Firm—Lerner, David, Littenberg, Krumholz & Mentlik, LLP

(57) ABSTRACT

Disclosed herein is a light amount adjustment apparatus, including: a shutter blade and a filter blade each configured to operate in a predetermined direction to adjust the amount of light transmitted through a lens group; a first magnet configured to drive the shutter blade; a first core and a first coil; a second magnet configured to drive the filter blade; and a second core and a second coil. The filter blade has a control portion for controlling and adjusts the amount of light transmitted through the lens group. The filter blade has at least one hole or one cutaway portion formed at a portion of the filter blade other than the control portion.

6 Claims, 21 Drawing Sheets

LIGHT AMOUNT ADJUSTMENT APPARATUS AND IMAGE PICKUP APPARATUS

CROSS REFERENCE TO RELATED APPLICATIONS

The present application claims priority from Japanese Patent Application No. JP 2007-009443 filed in the Japanese Patent Office on Jan. 18, 2007, the entire content of which is incorporated herein by reference.

BACKGROUND OF THE INVENTION

1. Field of the Invention

This invention relates to a light amount adjustment apparatus and an image pickup apparatus.

2. Description of the Related Art

An image pickup apparatus of a video camera, a still camera or a light apparatus includes a light amount adjustment apparatus for adjusting the amount of light fetched through a lens group.

In one of such light amount adjustment apparatus, shutter blades, a filter blade or the like serving as light amount adjustment members are supported for pivotal motion on a base member. The light amount adjustment members are pivoted by an electromagnet or actuator including a magnet, a coil and a core having a pair of confronting portions to adjust the light amount. One of light amount adjustment apparatus of the type described is disclosed, for example, in Japanese Patent Laid-Open No. 2004-95703 (hereinafter referred to as Patent Document 1).

SUMMARY OF THE INVENTION

Incidentally, in some light amount adjustment apparatus, when the coil is not energized, the magnet is attracted to one side or the opposite side in the direction of rotation by the core to hold the shutter blades and the filter blade at an open position at which incoming light is not intercepted or a closed position at which incoming light is intercepted.

In such a holding method as just described, an outer circumferential face of the magnet in the form of a disk and part of the core are opposed to each other so that the magnet is attracted by the core. In this instance, as the confronting angle between the magnet and the core, that is, the central angle between the outer circumferential face of the magnet and a portion of the core which opposes to the magnet, decreases, the holding force of the core for the magnet increases. Accordingly, the force for retaining the shutter blades and the filter blade, which are pivoted in response to rotation of the magnet, at the open position when the coil is not energized increases as the confronting angle described above decreases.

However, as regards driving of the shutter blades, if the holding force for the shutter blade when the coil is not energized increases, then such a disadvantage occurs that power gets higher upon starting of the shutter blades or the shutter speed is decreased. Therefore, it is desirable to reduce the holding force.

On the other hand, as regards driving of the shutter blades, since they have a comparatively great thickness and have a comparatively high weight, it is necessary to assure high holding force in order to stabilize the holding position of the filter blade when the coil is not energized.

In this manner, if it is designed to reduce the holding force for the shutter blades when the coil is not energized and increase the holding force for the filter blade when the coil is not energized, then it is difficult to achieve use of common parts in regard to the core and the magnet between an actuator for driving the shutter blades and another actuator for driving the filter blade. This gives rise to disadvantages that a high fabrication cost may be required and that the assemblability is deteriorated.

Therefore, it is demanded to provide a light amount adjustment apparatus and an image pickup apparatus by which common use of parts can be anticipated.

According to an embodiment of the present invention, the shape of shutter blades and the positional relationship of the shutter blades with some other members are contrived to achieve such common use of parts.

In particular, according to an embodiment of the present invention, there is provided a light amount adjustment apparatus including a shutter blade and a filter blade each configured to operate in a predetermined direction to adjust the amount of light transmitted through a lens group, a first magnet configured to drive the shutter blade, a first core and a first coil, a second magnet configured to drive the filter blade, and a second core and a second coil, the filter blade having a control portion for controlling and adjusting the amount of light transmitted through the lens group, the filter blade having at least one hole or one cutaway portion formed at a portion of the filter blade other than the control portion.

With the light amount adjustment apparatus, the weight of the filter blade is reduced. Therefore, the holding force for the filter blade when the coil is not energized can be reduced, and common use of parts for a driving section for operating the shutter blade and another driving section for operating the filter blade can be achieved. As a result, reduction of the fabrication cost and improvement of the assemblability can be anticipated as much.

The light amount adjustment apparatus may be configured such that the second magnet is formed as a disk and supported for rotation in a circumferential direction, the filter blade being supported for pivotal motion to adjust the amount of light, the light amount adjustment apparatus further including a driving arm connected for pivotal motion by rotation of the second magnet and having a driving pin connected to the filter blade for pivoting the filter blade, the center of pivotal motion of the filter blade being positioned on the opposite side to the center of rotation of the second magnet with respect to the driving pin over an overall range of the pivotal motion of the filter blade from a line segment perpendicular to a line segment interconnecting the center of rotation of the second magnet and the driving pin on a plane within which the filter blade is pivoted. With the light amount adjustment apparatus, the holding force for the filter blade when the coil is not energized can be reduced.

According to another embodiment of the present invention, there is provided an image pickup apparatus including a lens barrel having a predetermined lens group disposed inside, an apparatus body configured to support the lens barrel, and a light amount adjustment apparatus incorporated in the lens barrel and configured to adjust the amount of light fetched through the lens group, the light amount adjustment apparatus having a shutter blade configured to be operated in a predetermined direction by a first actuator, which includes a first magnet, a first core and a first coil, to adjust the amount of light transmitted through the lens group, and a filter blade configured to be operated in a predetermined direction by a second actuator, which includes a second magnet, a second core and a second coil, to adjust the amount of the light transmitted through the lens group, the filter blade having a control portion for controlling and adjusting the amount of the light transmitted through the lens group, the filter blade having at least one hole or one cutaway portion formed at a portion of the filter blade other than the control portion.

With the image pickup apparatus, the weight of the filter blade is reduced. Therefore, the holding force for the filter blade when the coil is not energized can be reduced, and common use of parts for a driving section for operating the shutter blade and another driving section for operating the filter blade can be achieved. As a result, reduction of the fabrication cost and improvement of the assemblability can be anticipated as much.

According to a further embodiment of the present invention, there is provided a light amount adjustment apparatus including a shutter blade and a filter blade each configured to operate in a predetermined direction to adjust the amount of light transmitted through a lens group, a first magnet configured to drive the shutter blade, a first core and a first coil, a second magnet configured to drive the filter blade, and a second core and a second coil, the second magnet being formed as a disk and supported for rotation in a circumferential direction, and the filter blade being supported for pivotal motion to adjust the amount of light. The light amount adjustment apparatus further includes a driving arm connected for pivotal motion by rotation of the second magnet and has a driving pin connected to the filter blade for pivoting the filter blade, the center of pivotal motion of the filter blade being positioned on the opposite side to the center of rotation of the second magnet with respect to the driving pin over an overall range of the pivotal motion of the filter blade from a line segment perpendicular to a line segment interconnecting the center of rotation of the second magnet and the driving pin on a plane within which the filter blade is pivoted.

With the light amount adjustment apparatus, the force of rotation acting upon the magnet when pivoting force is applied to the filter blade is low. Therefore, the holding force for the filter blade when the coil is not energized can be reduced, and common use of parts for a driving section for operating the shutter blade and another driving section for operating the filter blade can be achieved. As a result, reduction of the fabrication cost and improvement of the assemblability can be anticipated as much.

The light amount adjustment apparatus may be configured such that the filter blade has a control portion for controlling and adjusting the amount of light transmitted through the lens group, and the filter blade has at least one hole or one cutaway portion formed at a portion of the filter blade other than the control portion. With the light amount adjustment apparatus, the weight of the filter blade is reduced, and therefore, the holding force for the filter blade when the coil is not energized can be reduced.

According to a still further embodiment of the present invention, there is provided an image pickup apparatus including a lens barrel having a predetermined lens group disposed inside, an apparatus body configured to support the lens barrel, and a light amount adjustment apparatus incorporated in the lens barrel and configured to adjust the amount of light fetched through the lens group. The light amount adjustment apparatus includes a shutter blade configured to be operated in a predetermined direction by a first actuator, which includes a first magnet, a first core and a first coil, to adjust the amount of light transmitted through the lens group, and a filter blade configured to be operated in a predetermined direction by a second actuator, which includes a second magnet, a second core and a second coil, to adjust the amount of the light transmitted through the lens group, the second magnet being formed as a disk and supported for rotation in a circumferential direction, the filter blade being supported for pivotal motion to adjust the amount of light The light amount adjustment apparatus further includes a driving arm connected for pivotal motion by rotation of the second magnet and having a driving pin connected to the filter blade for pivoting the filter blade, the center of pivotal motion of the filter blade being positioned on the opposite side to the center of rotation of the second magnet with respect to the driving pin over an overall range of the pivotal motion of the filter blade from a line segment perpendicular to a line segment interconnecting the center of rotation of the second magnet and the driving pin on a plane within which the filter blade is pivoted.

With the image pickup apparatus, the force of rotation acting upon the magnet when pivoting force is applied to the filter blade is low. Therefore, the holding force for the filter blade when the coil is not energized can be reduced, and common use of parts for a driving section for operating the shutter blade and another driving section for operating the filter blade can be achieved. As a result, reduction of the fabrication cost and improvement of the assemblability can be anticipated as much.

The above and other objects, features and advantages of the present invention will become apparent from the following description and the appended claims, taken in conjunction with the accompanying drawings in which like parts or elements denoted by like reference symbols.

DETAILED DESCRIPTION OF THE PREFERRED EMBODIMENT

In the following, a preferred embodiment of the present invention is described in detail with reference to the accompanying drawings.

In the embodiment described below, the present invention is applied to a still camera. It is to be noted that the application of the present invention is not limited to a still camera, but the present invention can be applied widely, for example, to video cameras and various image pickup apparatus incorporated in various other apparatus.

In the following description, the directions such as forward, backward, upward, downward, leftward and rightward directions are represented as directions as viewed from an image pickup person upon image pickup of the still camera.

Accordingly, the image pickup object side is represented as the front side while the image pickup person side is represented as the rear side.

It is to be noted that the forward, backward, upward, downward, leftward and rightward directions used in the following description are determined for the convenience of description, but such directions can be applied suitably when the present invention is carried out.

Figure 1:
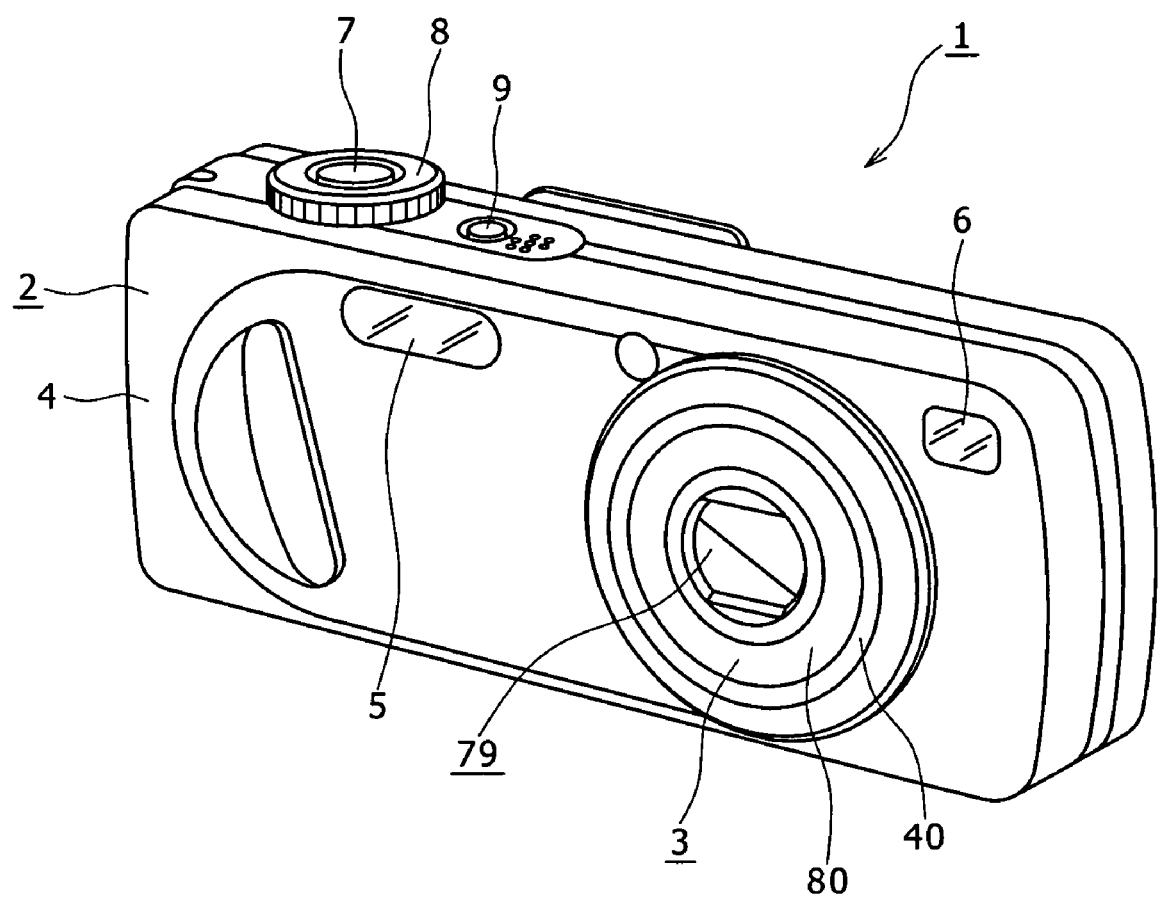
FIG. 1 is a perspective view showing an image pickup apparatus to which the present invention is applied in a state wherein a lens barrel is accommodated in an apparatus body.
Figure 2:
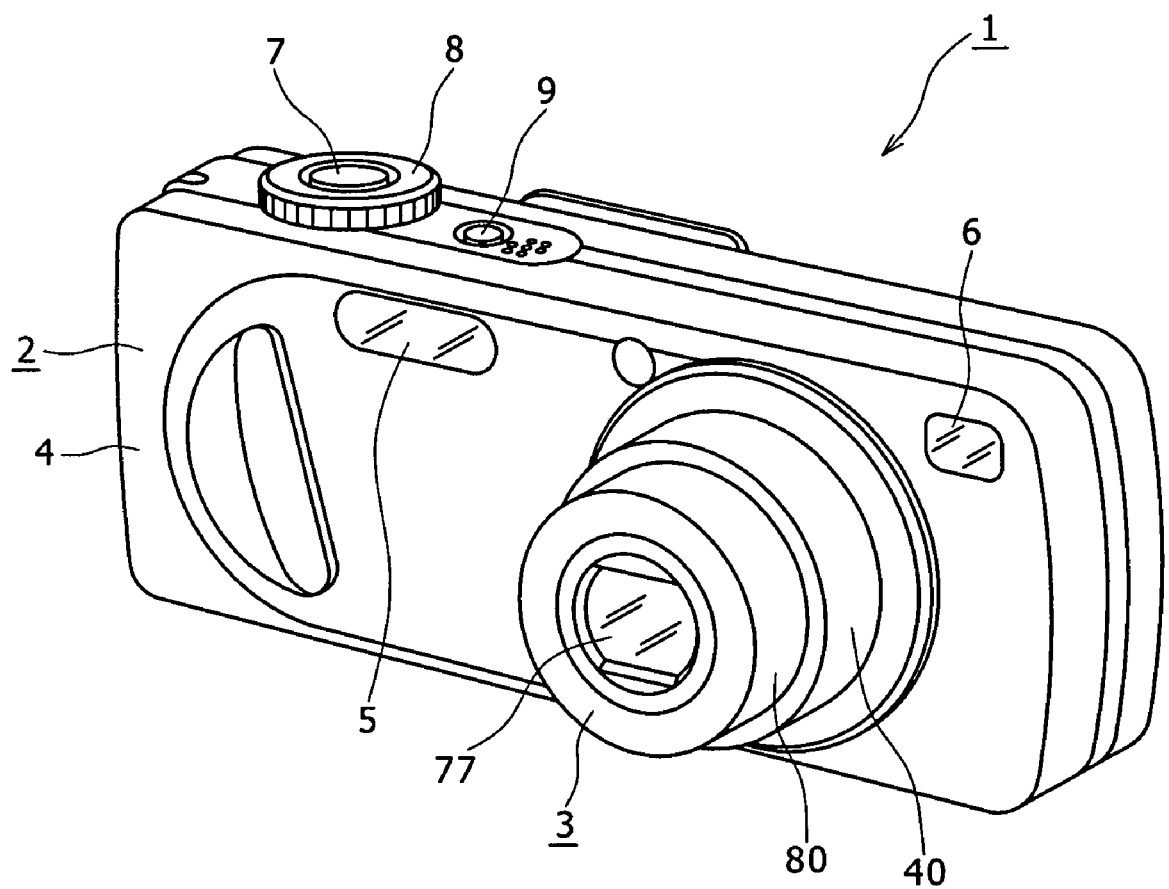
FIG. 2 is a similar view but showing the image pickup apparatus in another state wherein the lens barrel is projected from the apparatus body.

Referring first to FIGS. 1 and 2, the image pickup apparatus 1 shown includes an apparatus body 2 and a lens barrel 3 supported for movement in forward and backward directions, that is, in the opposite directions of an optical axis, on the apparatus body 2. When the image pickup apparatus 1 is not used for image pickup or in a like case, the lens barrel 3 is accommodated in the apparatus body 2 as seen in FIG. 1, but when the image pickup apparatus 1 is used for image pickup or in some other case, the lens barrel 3 is projected forwardly from the apparatus body 2 as seen in FIG. 2. Thus, in the present image pickup apparatus 1, the lens barrel 3 is formed as a lens barrel of the collapsible type.

Since the image pickup apparatus 1 includes the collapsible lens barrel 3, both of miniaturization or reduced thickness in a non-image pickup state of the image pickup apparatus 1 and assurance of a good optical performance in an image pickup state.

Figure 3:
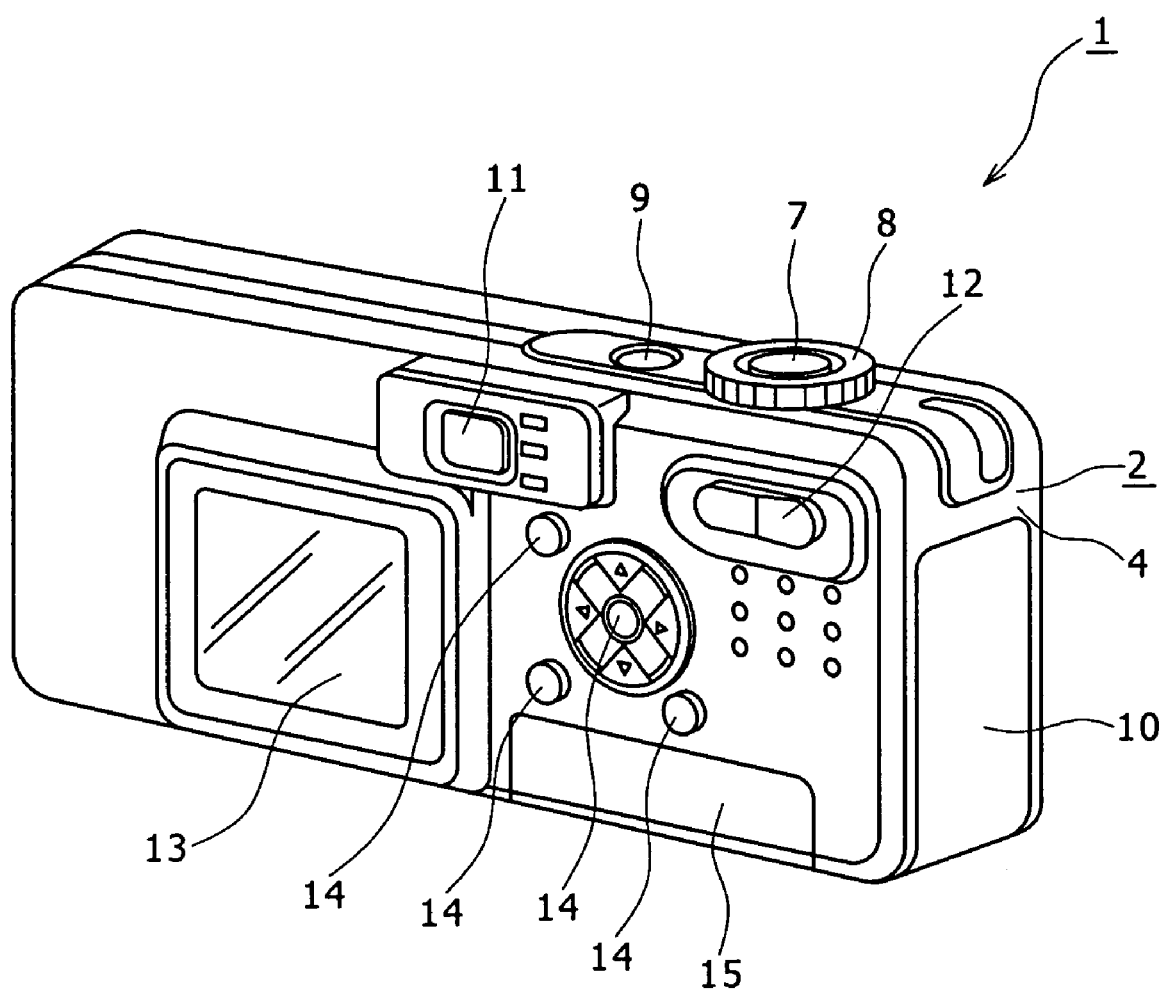
FIG. 3 is a perspective view of the image pickup apparatus in a state wherein it is viewed from the opposite side to that in FIGS. 1 and 2.

Referring to FIGS. 1 to 3, the apparatus body 2 has various elements disposed on the inner side and the outer side of a housing 4 of a horizontally elongated and flattened outer profile.

A flash 5 and a finder window 6 are provided on the front face of the apparatus body 2. A shutter button 7, a mode changeover dial 8 and a power supply button 9 are provided on the top face of the apparatus body 2. A battery cover 10 is provided on the right face of the apparatus body 2 such that it can be opened or closed to allow insertion and removal of a battery not shown into and from the apparatus body 2. A finder 11, a zoom switch 12, a display screen 13, operation buttons 14 and a terminal cover 15 are provided on the rear face of apparatus body 2. A power supply terminal, input and output terminals and so forth not shown are provided on the inner side of the terminal cover 15.

Figure 4:
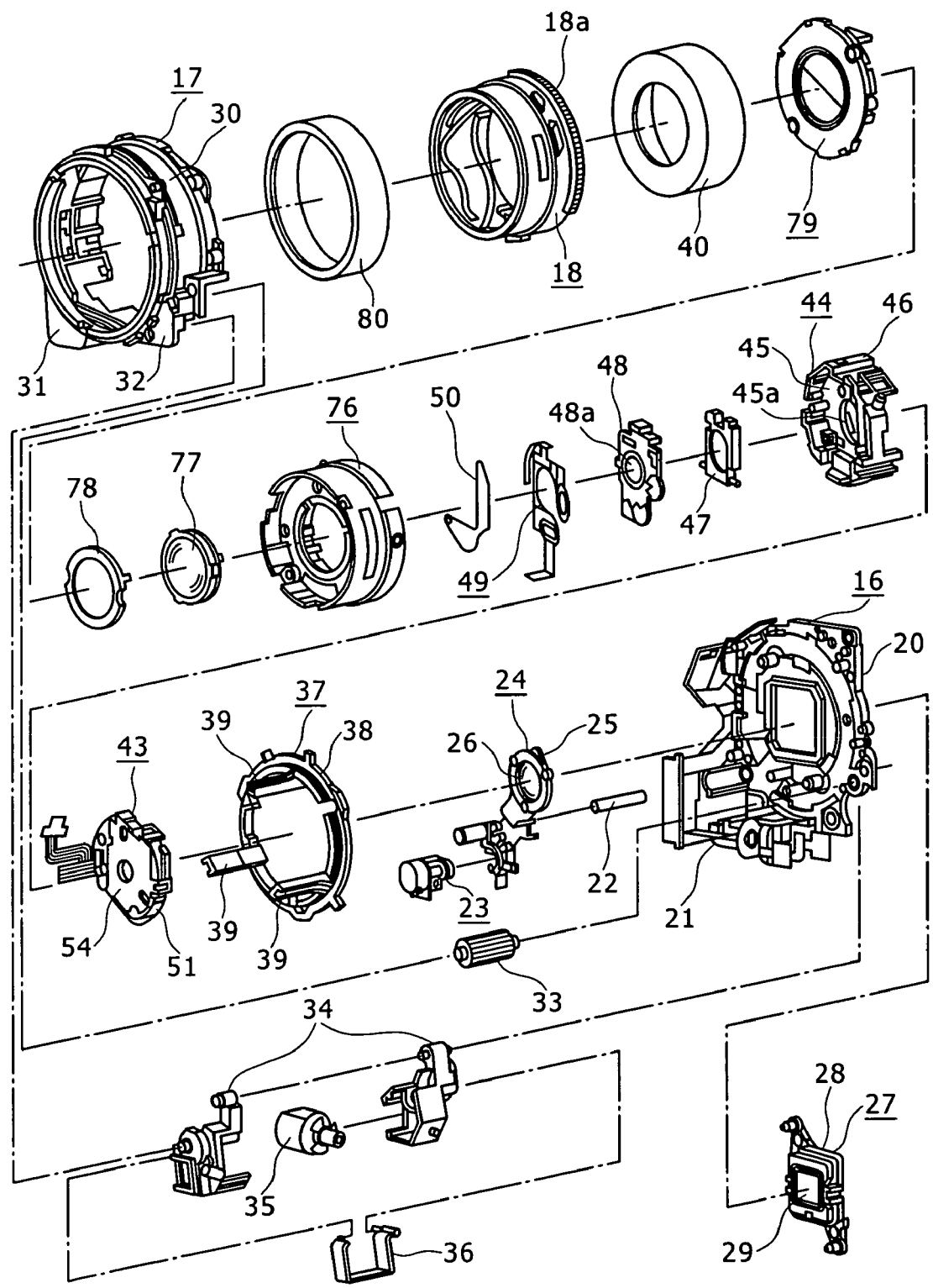
FIG. 4 is an explode perspective view of the lens barrel.
Figure 5:
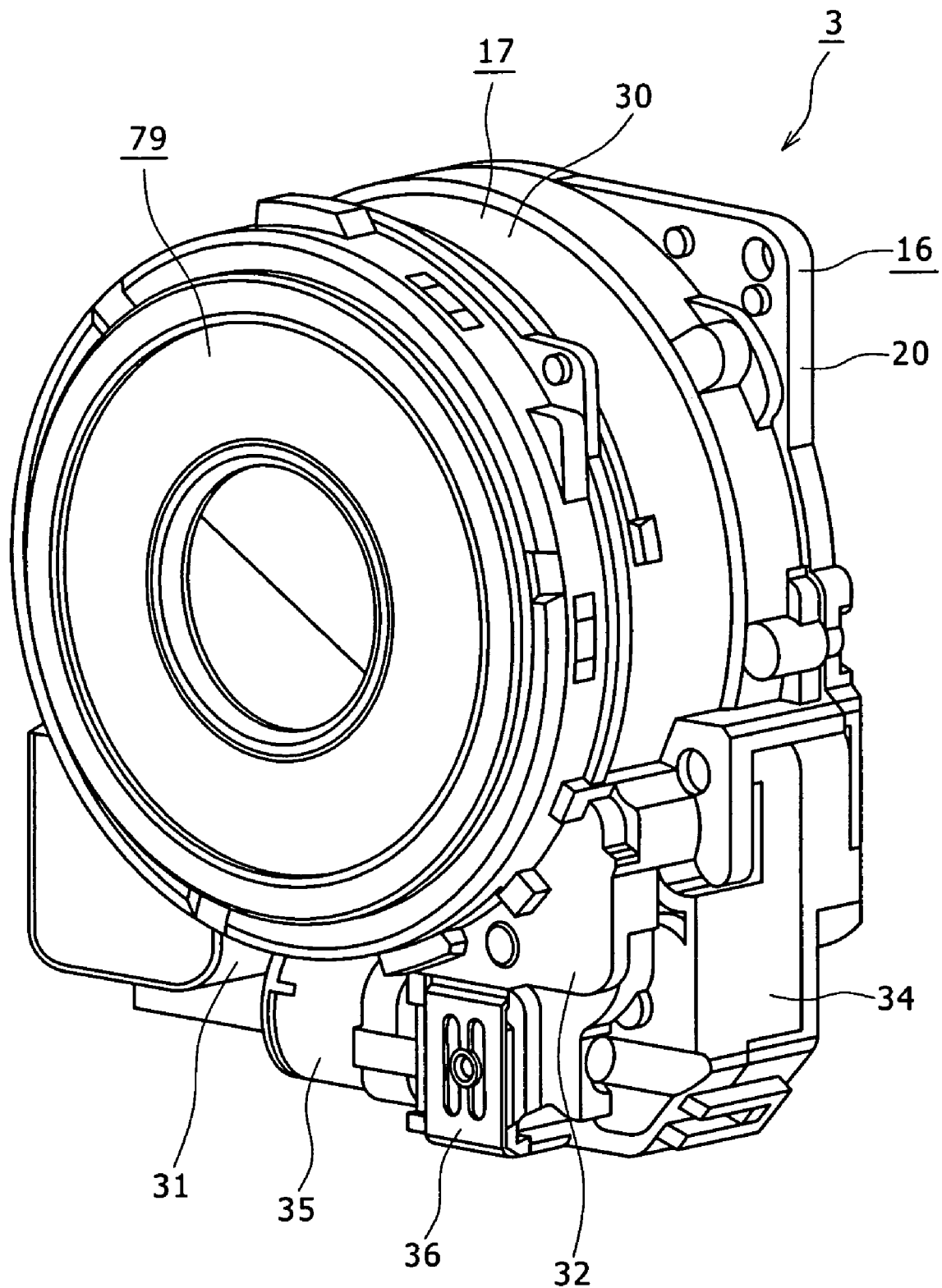
FIG. 5 is an enlarged perspective view of the lens barrel.
Figure 6:
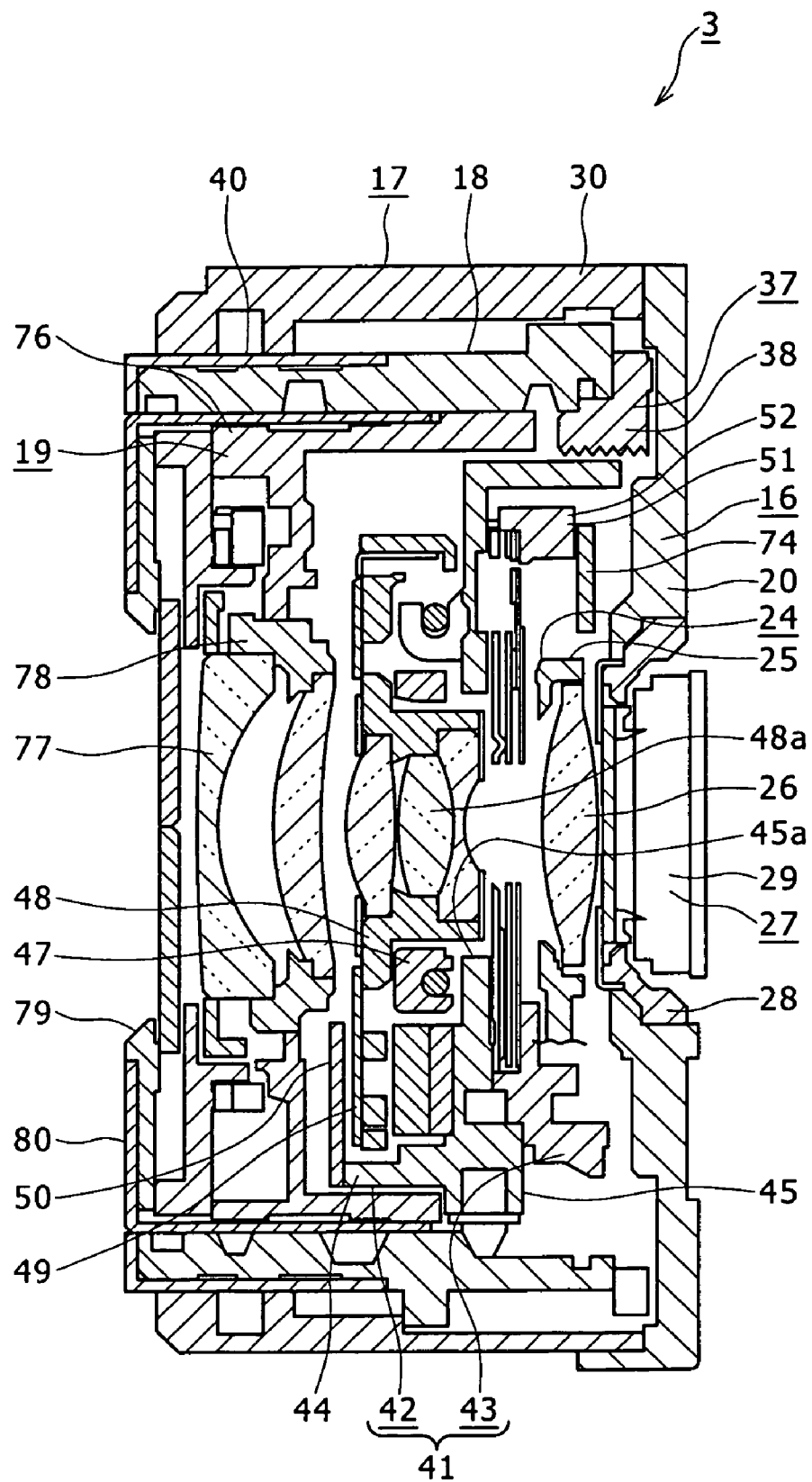
FIG. 6 is an enlarged cross sectional view of the lens barrel in a collapsed position.

Referring now to FIGS. 4 to 6, the lens barrel 3 includes a fixation member 16, a fixation ring 17 secured to the fixation member 16, and a cam cylinder 18 supported for rotation on the fixation ring 17. The lens barrel 3 further includes a first movable unit 19 supported for movement in the forward and backward directions, that is, in the directions of the optical axis, on the cam cylinder 18.

The fixation member 16 includes a base plate portion 20 formed in a substantially plate form and directed in the forward and backward directions, and an attaching projection 21 projecting forwardly from a lower end portion of the base plate portion 20.

A guide rod 22 is attached to the base plate portion 20.

A focusing motor unit 23 is attached to the attaching projection 21. A focusing movement unit 24 is moved in the forward and backward direction, that is, in the opposite directions of the optical axis, by the focusing motor unit 23. The focusing movement unit 24 includes a holding arm 25, and a focusing lens group 26 attached to the holding arm 25.

When the focusing motor unit 23 is driven, the focusing movement unit 24 is moved in a direction of the optical axis under the guidance of the guide rod 22.

An image pickup unit 27 is attached to a rear portion of the fixation member 16 as seen in FIG. 4. The image pickup unit 27 includes a holding frame member 28, and an image pickup element 29 such as, for example, a CCD (Charge Coupled Device) unit, held by the holding frame member 28. The image pickup unit 27 is attached at the holding frame member 28 thereof to the fixation member 16.

The fixation ring 17 is attached to the front of the fixation member 16 as seen in FIGS. 4 and 5. The fixation ring 17 has a cylindrical base portion 30 formed in a substantially cylindrical shape, a unit holding down portion 31 projecting from an lower end portion of the right end side of the cylindrical base portion 30, and a case attaching portion 32 projecting from a lower end portion of the left end side of the cylindrical base portion 30.

A gear arrangement hole not shown is formed at a position of the cylindrical base portion 30 corresponding to the case attaching portion 32.

In a state wherein the fixation ring 17 is attached to the fixation member 16, the guide rod 22 and the focusing motor unit 23 are held from forwardly by the unit holding down portion 31.

In the state wherein the fixation ring 17 is attached to the fixation member 16, a transmission gear 33 elongated in the axial direction is supported for rotation between the case attaching portion 32 and the fixation member 16. The transmission gear 33 is disposed in the gear arrangement hole formed in the cylindrical base portion 30.

A case body 34 is attached to the case attaching portion 32 of the fixation ring 17.

A motor 35 is attached in the case body 34 as seen in FIG. 4. A transmission gear group not shown is disposed in the case body 34 and held in meshing engagement with the transmission gear 33. When the motor 35 rotates, the driving force thereof is transmitted to the transmission gear 33 through the transmission gear group.

The case body 34 is attached to the fixation ring 17 and the fixation member 16 through an attaching leaf spring 36.

The cam cylinder 18 is supported for movement in the backward and forward directions and for rotation in a circumferential direction on the fixation ring 17 (referred to as FIGS. 4 and 6).

The cam cylinder 18 is substantially in a ring shape and has a rack gear 18a provided at part of an outer circumferential face at a rear end thereof.

The cam cylinder 18 is supported for movement in the backward and forward directions and for rotation in a circumferential direction on the fixation ring 17.

In the state wherein the cam cylinder 18 is supported on the fixation ring 17, the rack gear 18a meshes with the transmission gear 33 supported for rotation between the fixation member 16 and the fixation ring 17. Accordingly, when the motor 35 held on the case body 34 rotates, the driving force thereof is transmitted to the rack gear 18a through the transmission gear set and the transmission gear 33 so that the cam cylinder 18 is rotated in a direction corresponding to the direction of rotation of the motor 35. Consequently, the cam cylinder 18 is moved in the forward or backward direction while it rotates relative to the fixation ring 17.

A straightforward guide 37 is supported for movement in the backward and forward directions on the fixation ring 17. The straightforward guide 37 is formed as a unitary member from an annular portion 38 and three guide projections 39 projecting forwardly from the annular portion 38.

The straightforward guide 37 is supported for movement in the forward and backward directions and for rotation relative to the cam cylinder 18 on the fixation ring 17.

An ornamental ring 40 is attached to a front half of the fixation ring 17 as seen in FIGS. 4 and 6.

Figure 7:
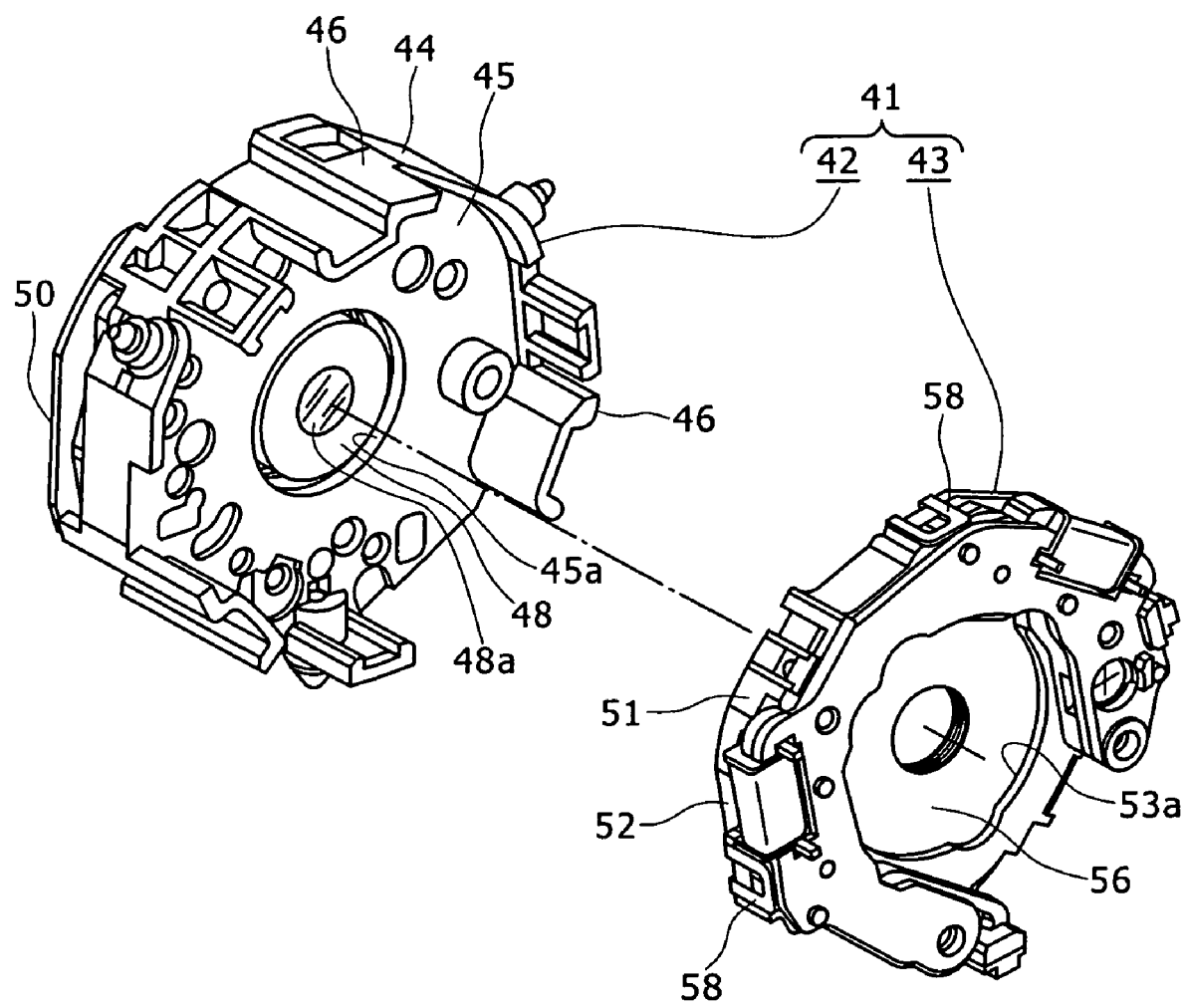
FIG. 7 is an enlarged perspective view showing an intermediate movable unit and a light amount adjustment apparatus of the lens barrel in a disassembled state.

A second movable unit 41 is supported on the cam cylinder 18 as seen in FIG. 6. The second movable unit 41 includes an intermediate movable unit 42 and a light amount adjustment apparatus 43 attached to the intermediate movable unit 42 as seen in FIG. 7.

The intermediate movable unit 42 includes several members supported on or attached to a base frame 44.

The base frame 44 includes a disk portion 45, and a supported face portion 46 provided on an outer circumferential portion of the disk portion 45.

A transmission opening 45a is formed at a central portion of the disk portion 45 such that it extends forwardly and backwardly through the disk portion 45.

A first correcting movable frame 47 is supported for movement in the leftward and rightward directions on the front face side of the base frame 44. A second correcting movable frame 48 is supported for movement in the upward and downward directions on the first correcting movable frame 47. A lens group 48a is attached to the second correcting movable frame 48.

A circuit board 49 is attached to the front face of the second correcting movable frame 48.

As described hereinabove, the first correcting movable frame 47 is supported on the base frame 44 while the second correcting movable frame 48 is supported on the first correcting movable frame 47, and in a state wherein the circuit board 49 is attached to the second correcting movable frame 48, an outer core 50 is attached to the front face of the base frame 44 to construct the intermediate movable unit 42.

Figure 8:
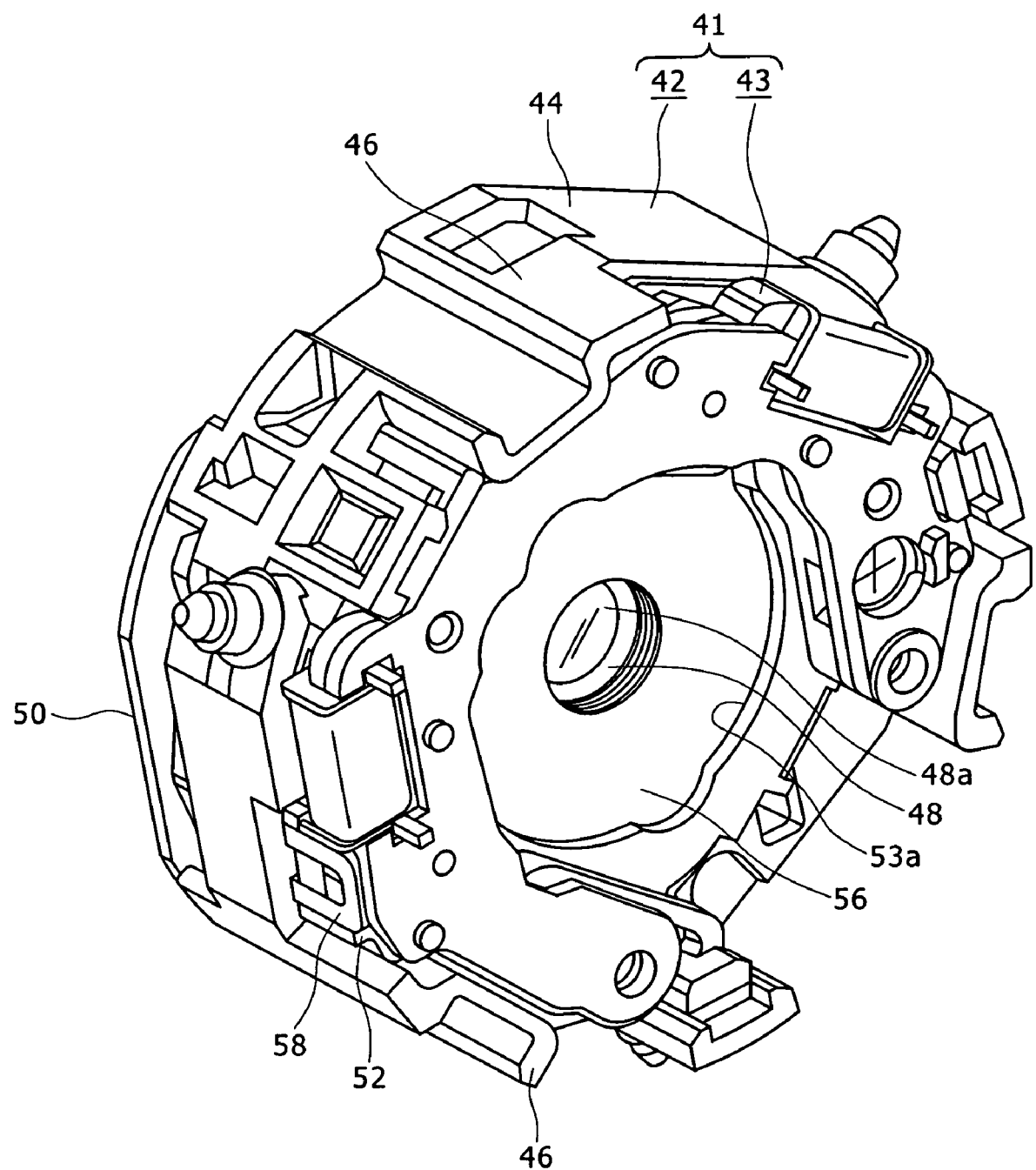
FIG. 8 is an enlarged perspective view of a second movable unit of the lens barrel.

The light amount adjustment apparatus 43 is attached to the rear face side of the intermediate movable unit 42, and the second movable unit 41 is formed from the intermediate movable unit 42 and the light amount adjustment apparatus 43 (as reference to FIGS. 7 and 8).

The second movable unit 41 is supported for movement in the forward and backward directions on the guide projections 39 of the straightforward guide 37 and supported for sliding movement on the cam cylinder 18. Accordingly, the second movable unit 41 is moved in the forward direction or the backward direction, that is, in a direction of the optical axis, under the guidance of the straightforward guide 37 by rotation of the cam cylinder 18.

The light amount adjustment apparatus 43 is attached to the rear face side of the base frame 44 as seen in FIGS. 7 and 8.

The light amount adjustment apparatus 43 includes a base member 51 and several members supported on or attached to the base member 51 as seen in FIGS. 7 to 10.

Figure 11:
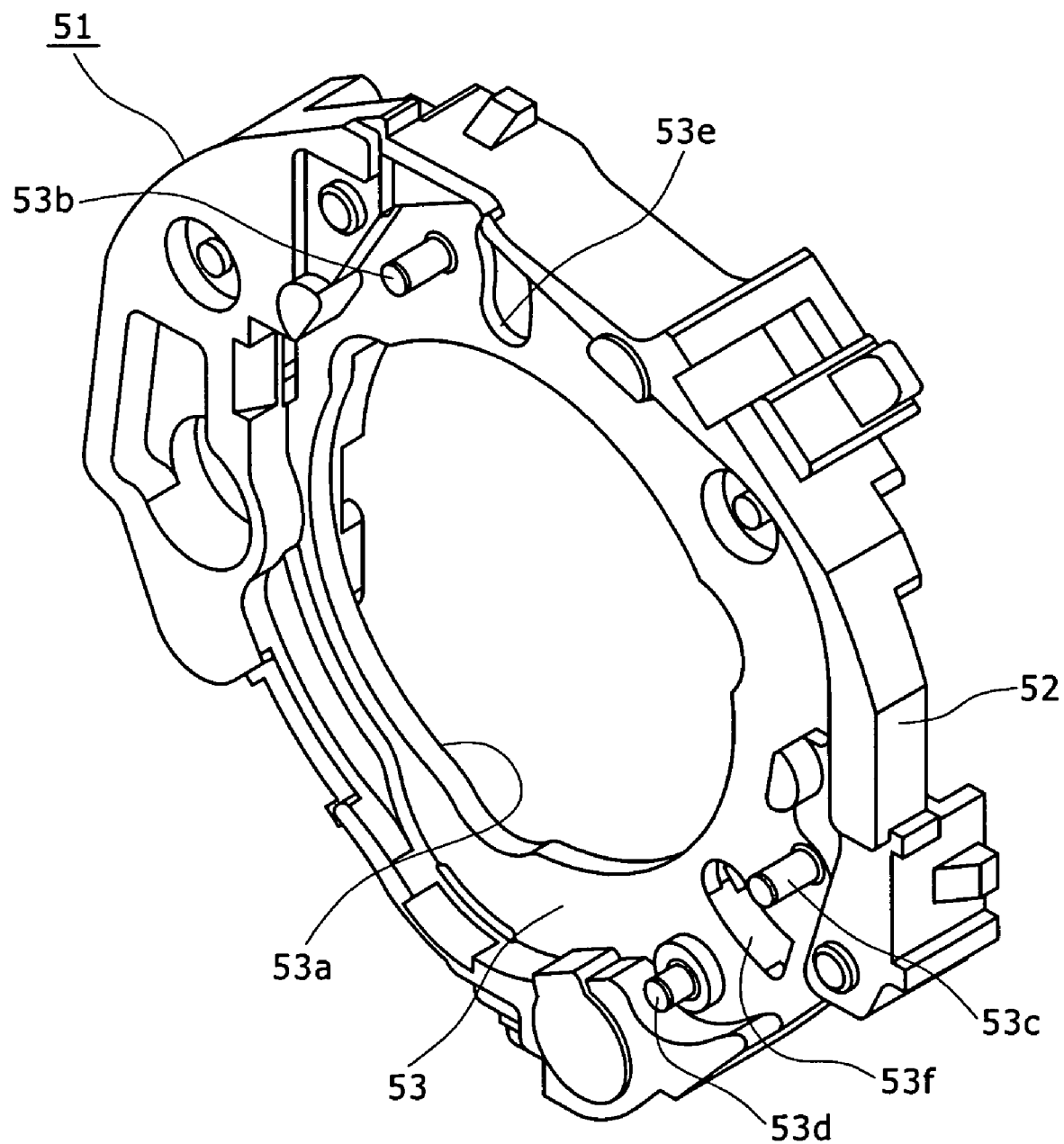
FIG. 11 is an enlarged perspective view of a base member of the light amount adjustment apparatus.

The base member 51 is formed in a substantially ring shape and has a mounting recessed portion 53 opened forwardly at a portion thereof except an outer circumferential portion 52 on the front face side as seen in FIG. 11. The base member 51 is formed at a portion thereof, at which the mounting recessed portion 53 is formed, with a thickness smaller than that of the outer circumferential portion 52.

A large perforation 53a is formed in the mounting recessed portion 53. A filter pivotal motion center shaft 53b and shutter pivotal motion center shafts 53c and 53d are provided at positions of the mounting recessed portion 53 around the perforation 53a such that they project forwardly. Arcuate fitting holes 53e and 53f are formed at the mounting recessed portion 53 such that they project forwardly and backwardly through the mounting recessed portion 53.

The filter pivotal motion center shaft 53b and the shutter pivotal motion center shafts 53c and 53d are positioned substantially on the opposite sides to each other across the perforation 53a. The shutter pivotal motion center shafts 53c and 53d are positioned in a spaced relationship from each other in a circumferential direction, and the fitting hole 53e is positioned in the proximity of the filter pivotal motion center shaft 53b while the fitting hole 53f is positioned between the shutter pivotal motion center shafts 53c and 53d.

Figure 9:
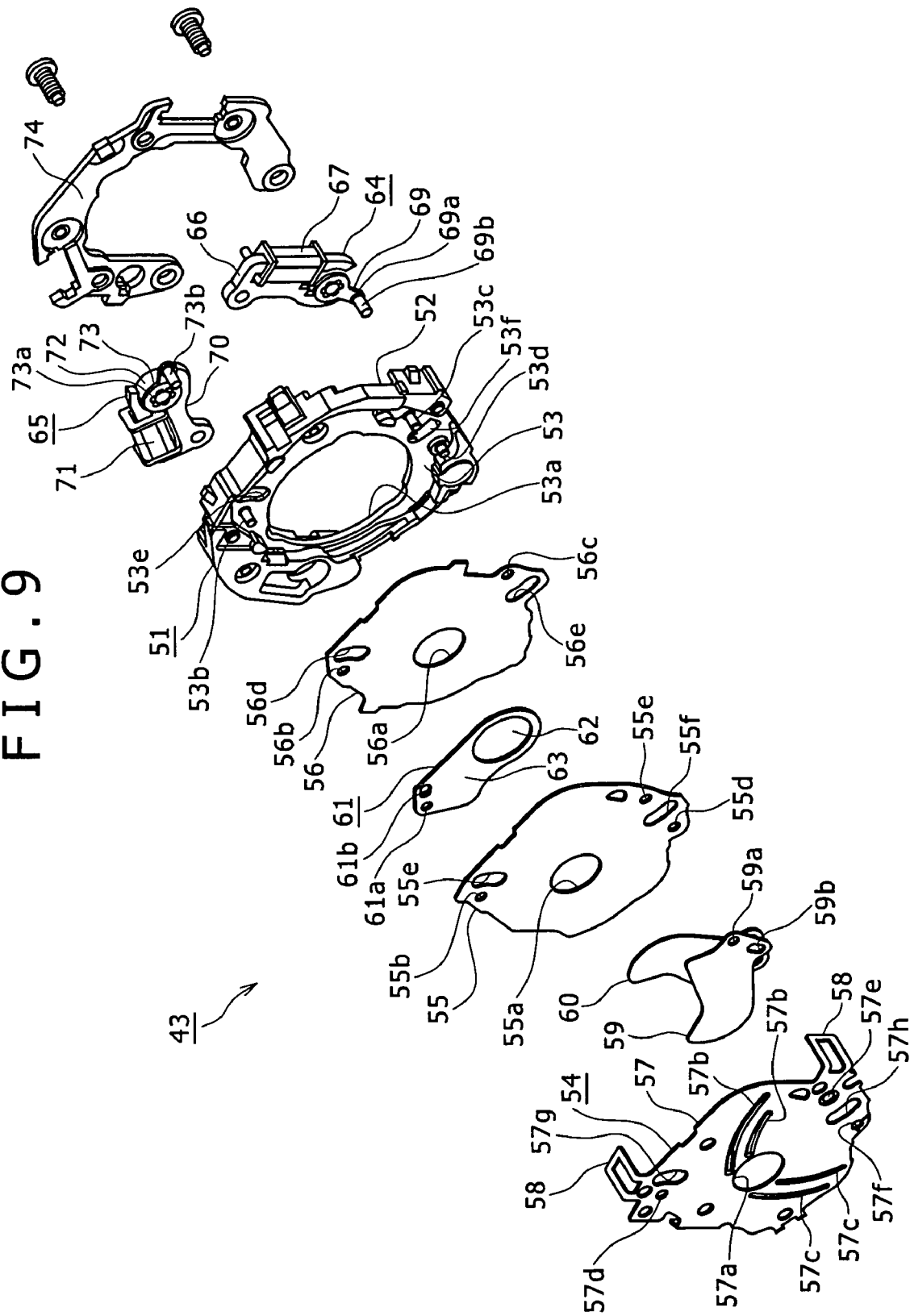
FIG. 9 is an exploded perspective view of the light amount adjustment apparatus.
Figure 10:
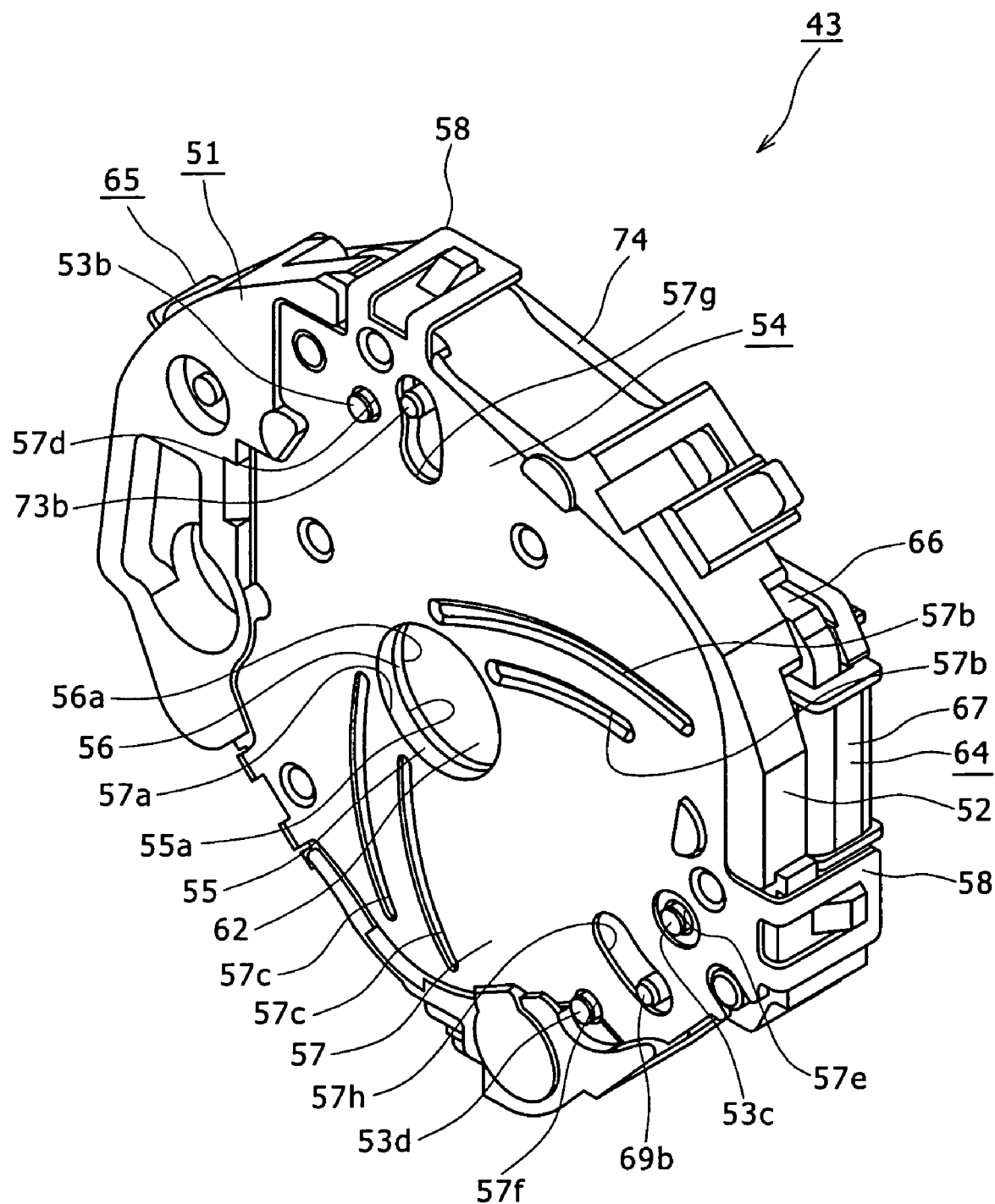
FIG. 10 is an enlarged perspective view of the light amount adjustment apparatus.

A cover plate 54, a first separator 55 and a second separator 56 are attached to the front face side of the base member 51 as seen in FIGS. 9 and 10.

The cover plate 54 is formed, for example, from a metal material and has a covering portion 57 directed in the forward and backward directions, and attached projections 58 projecting rearwardly from outer circumferential portions of the straightforward guide 37.

Figure 12:
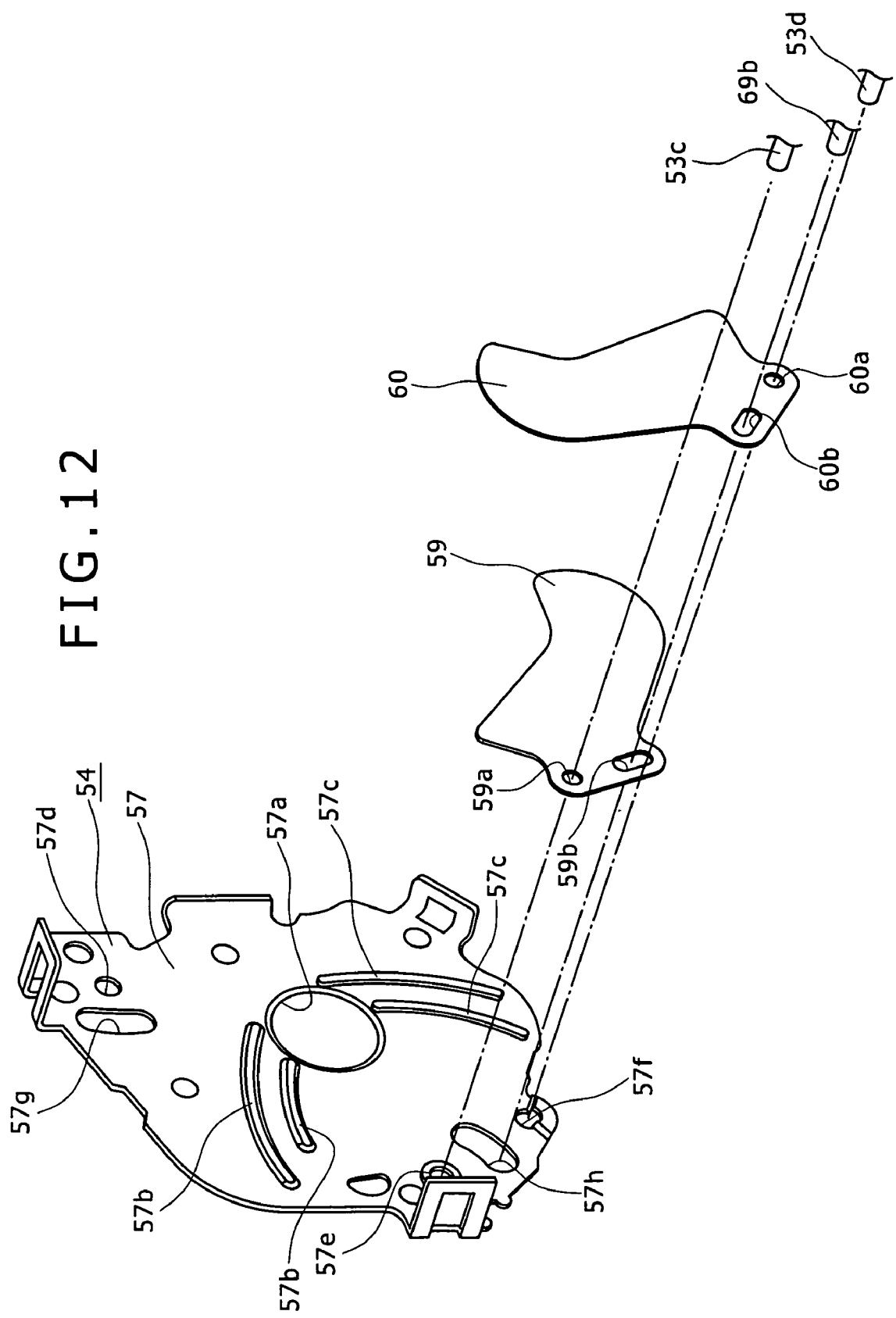
FIG. 12 is an enlarged exploded perspective view of a filter blade of the light amount adjustment apparatus.

A light passing hole 57a smaller than the perforation 53a of the base member 51 is formed at a central portion of the covering portion 57. A pair of first sliding projections 57b and a pair of second sliding projections 57c are formed on the covering portion 57 so as to be swollen rearwardly by stamping as seen in FIGS. 9 and 12.

Three shaft insertion holes 57d, 57e and 57f and two arcuate fitting holes 57g and 57h are formed at outer circumferential portions of the covering portion 57. The shaft insertion hole 57d and the shaft insertion holes 57e and 57f are formed on the substantially opposite sides to each other across the light passing hole 57a, and the shaft insertion holes 57e and 57f are positioned in a spaced relationship from each other in the circumferential direction. Further, the fitting hole 57g is positioned in the proximity of the shaft insertion hole 57d, and the fitting hole 57h is positioned between the shaft insertion holes 57e and 57f.

Referring to FIG. 9, the first separator 55 has a transmission hole 55a formed at a central portion thereof with a size substantially equal to that of the light passing hole 57a of the cover plate 54. Three shaft insertion holes 55b, 55c and 55d and arcuate fitting holes 55e and 55f are formed at outer circumferential portions of the first separator 55. The shaft insertion hole 55b and the shaft insertion holes 55c and 55d are positioned on the substantially opposite sides to each other across the transmission hole 55a, and the shaft insertion holes 55c and 55d are positioned in a spaced relationship from each other in the circumferential direction. Further, the fitting hole 55e is positioned in the proximity of the shaft insertion hole 55b, and the fitting hole 55f is positioned between the shaft insertion holes 55c and 55d.

The second separator 56 has a transmission hole 56a formed at a central portion thereof with a size substantially equal to that of the light passing hole 57a of the cover plate 54. Two shaft insertion holes 56b and 56c and two arcuate fitting holes 56d and 56e are formed at outer circumferential portions of the second separator 56. The shaft insertion hole 56b and the shaft insertion hole 56c are positioned on the substantially opposite sides to each other across the transmission hole 56a, and the fitting holes 56d and 56e are positioned in the proximity of the shaft insertion holes 56b and 56c, respectively.

A pair of shutter blades 59 and 60 and a filter blade 61 are supported for pivotal motion on the base member 51 as seen in FIGS. 9 and 12.

The shutter blades 59 and 60 are each formed from a material in the form of a sheet and have shaft insertion holes 59a and 60a and action holes 59b and 60b formed at one end portion thereof. The action holes 59b and 60b are elongated in one direction.

Figure 13:
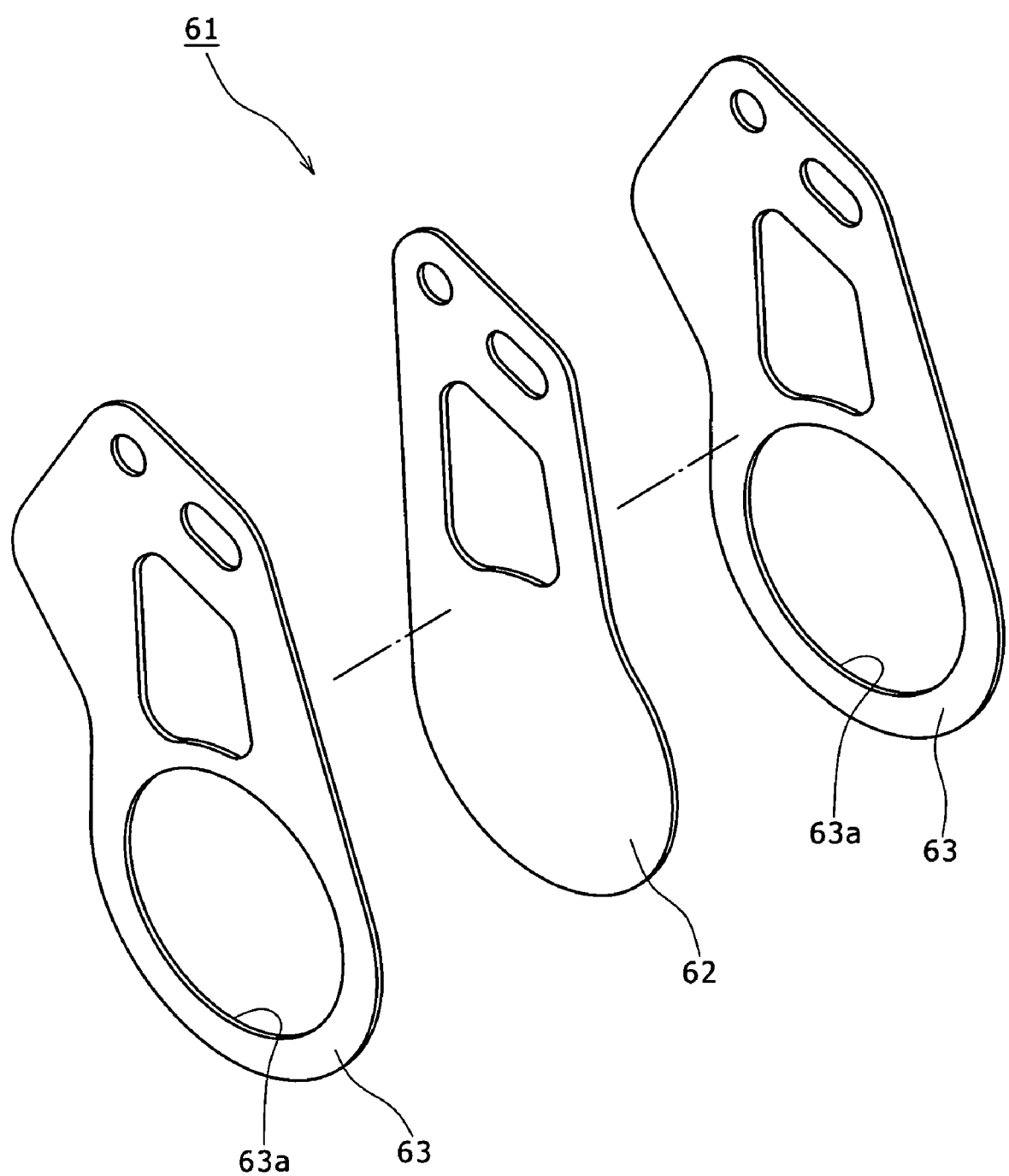
FIG. 13 is an enlarged perspective view of the filter blade.
Figure 14:
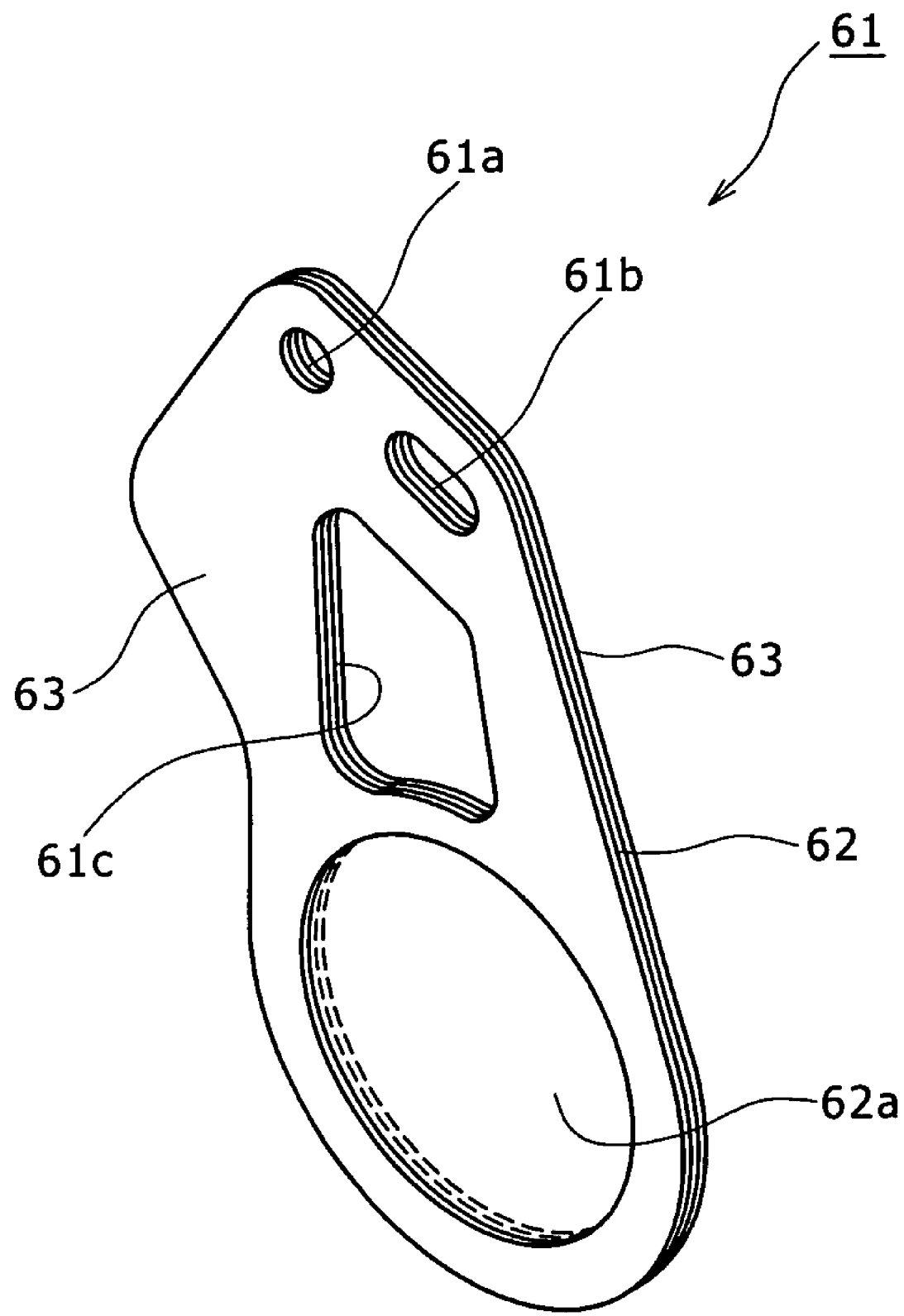
FIG. 14 is an enlarged front elevational view showing an actuator of the light amount adjustment apparatus.

Referring to FIGS. 13 and 14, the filter blade 61 is from two sheet members 63 formed on the opposite faces of a dimming filter 62 and coupled in a laminated state to each other. Each of the sheet members 63 has a circular hole 63a formed therein. The circular hole 63a has a diameter greater than that of the transmission hole 55a of the first separator 55. Accordingly, the filter blade 61 is exposed at the dimming filter 62 thereof at a position corresponding to the circular holes 63a. The exposed portion of the filter blade 61 is provided as a control portion 62a which controls and adjusts the amount of light. The dimming filter 62 is formed from an ND (Neutral Density) filter.

The filter blade 61 has formed at one end portion thereof a shaft insertion hole 61a and an action hole 61b which is elongated in one direction.

The filter blade 61 has a hole 61c formed therein as seen in FIG. 14. The hole 61c is provided to reduce the weight of the filter blade 61. Accordingly, in order to reduce the weight of the filter blade 61, the hole 61c may be replaced, for example, by a plurality of small holes or by at least one cutaway portion formed in the filter blade 61.

The second separator 56 is disposed at the mounting recessed portion 53 of the base member 51, and the filter pivotal motion center shaft 53b and the shutter pivotal motion center shaft 53c of the base member 51 are inserted in the shaft insertion holes 56b and 56c of the second separator 56, respectively. The shutter pivotal motion center shaft 53d is positioned on the immediately outer side of the second separator 56.

The filter blade 61 is supported on the front face side of the second separator 56 as seen in FIG. 9. The filter pivotal motion center shaft 53b of the base member 51 is inserted in the shaft insertion hole 61a of the filter blade 61 such that the filter blade 61 is supported for pivotal motion around the filter pivotal motion center shaft 53b on the base member 51.

The filter blade 61 has such a three-member configuration that the sheet members 63 are coupled in a layered fashion to the opposite faces of the dimming filter 62 as described hereinabove such that otherwise possible damage to the dimming filter 62 upon pivotal motion of the dimming filter 62 between the first separator 55 and the second separator 56 can be prevented.

In a state wherein the first separator 55 is attached to the base member 51, the shutter blades 59 and 60 are supported for pivotal motion on the base member 51 as seen in FIG. 12. In particular, the shutter pivotal motion center shafts 53c and 53d of the base member 51 are inserted in the shaft insertion holes 59a and 60a of the shutter blades 59 and 60, respectively. Consequently, the shutter blades 59 and 60 are supported in a partially overlapping relationship with each other for pivotal motion around the shutter pivotal motion center shafts 53c and 53d of the base member 51 on the base member 51, respectively.

In a state wherein the shutter blades 59 and 60 are supported on the base member 51, the cover plate 54 is attached to the base member 51 as seen in FIGS. 9 and 10. The cover plate 54 is attached to the base member 51 with the attached projections 58 thereof engaged with the outer circumferential portion 52 of the base member 51. Accordingly, the shutter blades 59 and 60 are disposed for pivotal motion between the cover plate 54 and the first separator 55.

A first actuator 64 and a second actuator 65 are attached to the rear face of the base member 51 as seen in FIG. 9.

Figure 15:
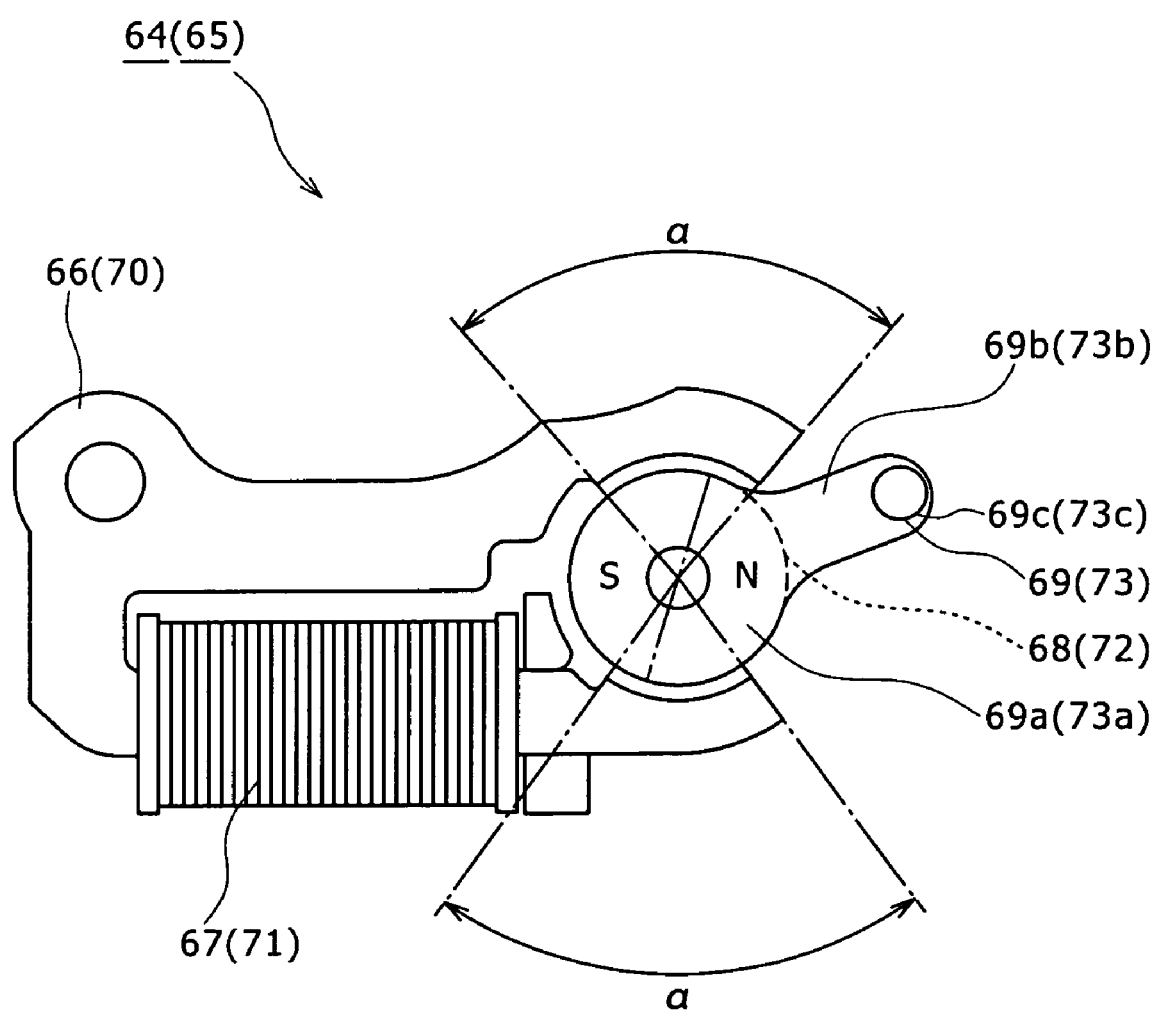
FIG. 15 is an enlarged front elevational view showing an actuator of the light amount adjustment apparatus.

As shown in FIG. 15, the first actuator 64 has a core 66, and a coil 67, a magnet 68 and a driving arm 69 held on the core 66. The driving arm 69 has a base portion 69a, and an arm portion 69b projecting forwardly from the base portion 69a. A driving pin 69c is provided at a free end portion of the arm portion 69b.

The core 66 has a pair of confronting portions 66a and 66b positioned so as to sandwich the magnet 68 therebetween from an outer circumference side, and a connecting portion 66c for connecting end portions of the confronting portions 66a and 66b to each other. The other end portions of the confronting portions 66a and 66b are formed arcuately along the outer circumferential face of the magnet 68.

The second actuator 65 has a core 70, and a coil 71, a magnet 72 and a driving arm 73 held on the core 70. The driving arm 73 has a base portion 73a, and an arm portion 73b projecting forwardly from the base portion 73a. A driving pin 73c is provided at a free end portion of the arm portion 73b.

The core 70 has a pair of confronting portions 70a and 70b positioned so as to sandwich the magnet 72 from an outer circumference side, and a connecting portion 70c for interconnecting end portions of the confronting portions 70a and 70b. End portions of the confronting portions 70a and 70b are shaped arcuately along the outer circumferential face of the magnet 68.

Inner faces of the arcuately shaped end portions of the confronting portions 66a, 66b and 70a, 70b are positioned in an opposing relationship to an outer circumferential face of the magnets 68 and 72, respectively. In the light amount adjustment apparatus 43, when the coil 67 or 71 is energized, the magnet 68 or 72 is attracted to one side or the outer side in the direction of rotation by the magnet 68 or 72 to hold the shutter blades 59 and 60 or the filter blade 61 at one end or the other end in the direction of pivotal motion of the same.

As the value of the confronting angle of the magnet 68 or 72 and the core 66 or 70, that is, the value of the central angle α of a portion of the outer circumferential face of the magnet 68 or 72 which confronts the core 66 or 70, decreases, the holding force of the core 66 or 70 for the magnet 68 or 72 increases. Accordingly, the force for holding the shutter blades 59 and 60 or the filter blade 61 which are or is pivoted in response to rotation of the magnet 68 or 72 increases as the confronting angle α decreases.

The first actuator 64 and the second actuator 65 exert rotating force between the cores 66 and 70 and the magnets 68 and 72 in response to current flowing through the coils 67 and 71, respectively. By the rotating force, the driving arms 69 and 73 are pivoted in a direction corresponding to the direction of the current flowing through the coils 67 and 71, respectively.

The first actuator 64 and the second actuator 65 are attached to positions of the base member 51 spaced away from each other in a circumferential direction while they are held from rearwardly by a holding plate 74 as seen in FIGS. 7 to 9.

In the state wherein the first actuator 64 and the second actuator 65 are attached to the base member 51, the driving pin 69c of the driving arm 69 is fitted in order into the fitting hole 53f of the base member 51, the shaft insertion hole 56e of the second separator 56, the action holes 59b and 60b of the shutter blades 59 and 60, the fitting hole 55f of the first separator 55 and the fitting hole 57h of the cover plate 54. Meanwhile, the driving pin 73c of the driving arm 73 is fitted in order into the fitting hole 53e of the base member 51, the fitting hole 56d of the second separator 56, the action hole 61b of the filter blade 61, the fitting hole 55e of the first separator 55 and the fitting hole 57g of the cover plate 54.

Figure 16:
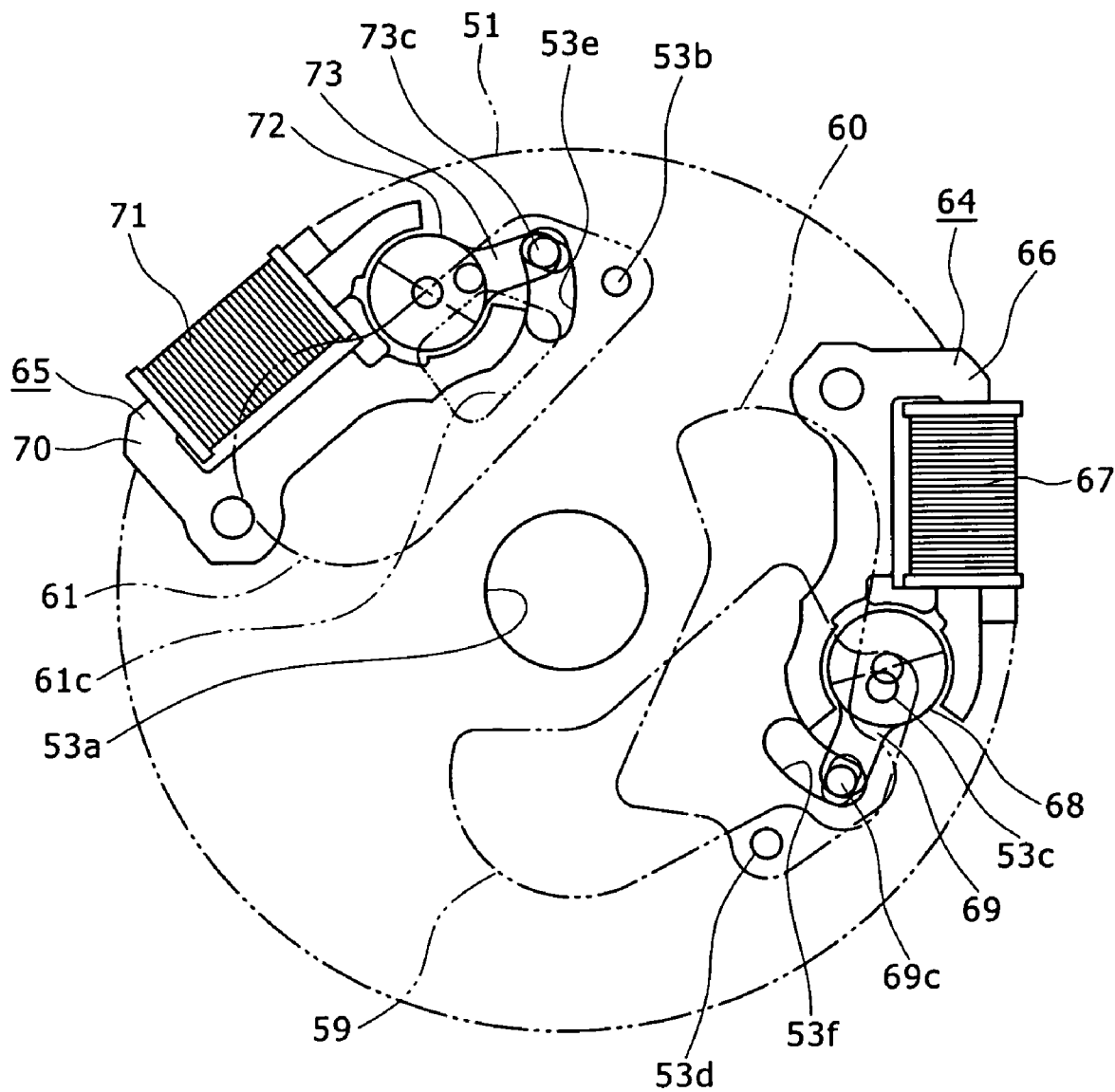
FIG. 16 is an enlarged front elevational view showing the shutter blades at an open position and the filter blade at an open position and illustrating an operation of the shutter blades and the filter blade.
Figure 17:
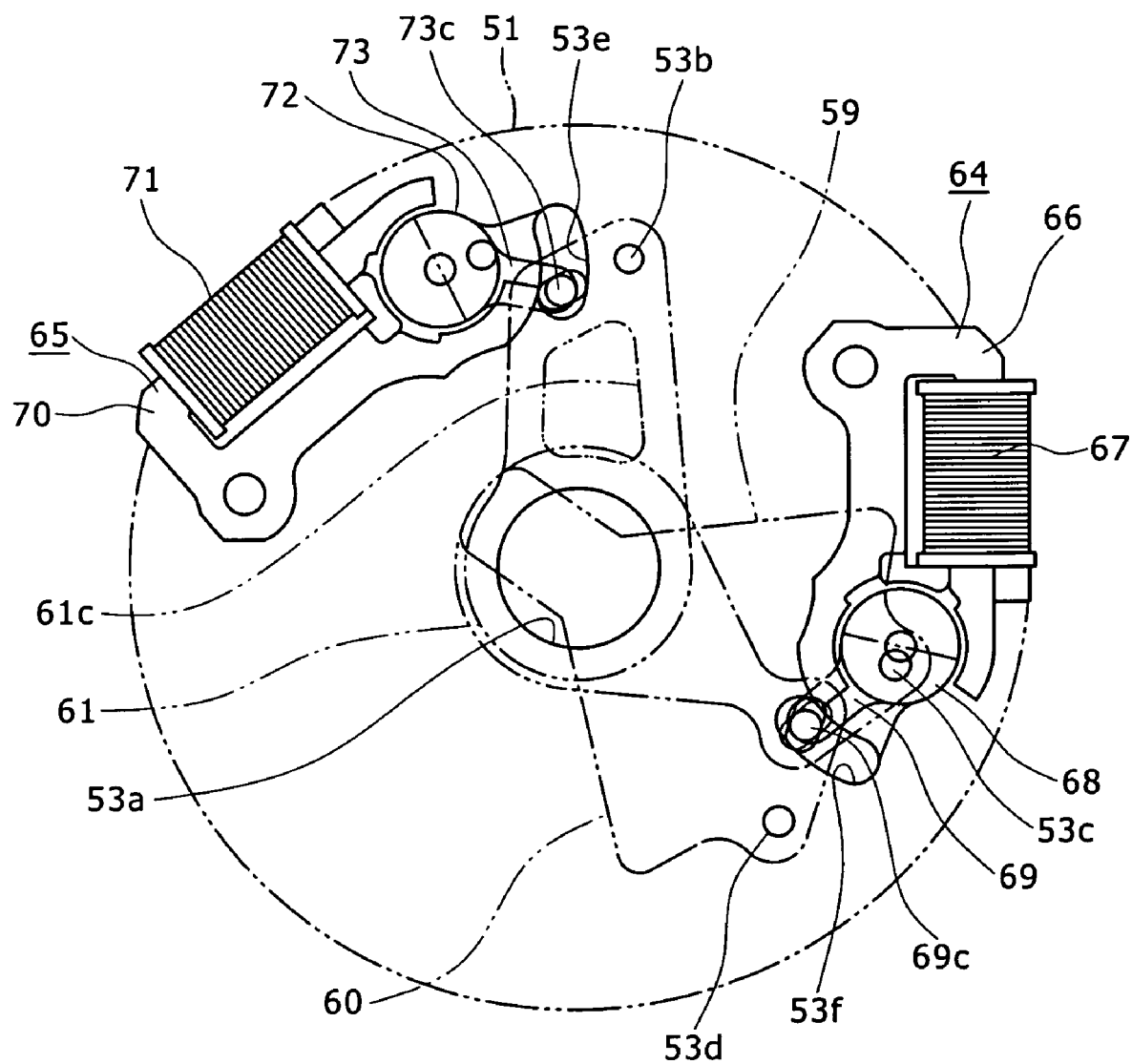
FIG. 17 is a similar view but showing the shutter blades at a closed position and the filter blade at a closed position and illustrating another operation of the shutter blades and the filter blade.

If the driving arm 69 is driven to pivot by the first actuator arm 64, then opening edges of the action holes 59b and 60b are pressed by the arm portion 69b as seen in FIGS. 16 and 17. Consequently, the shutter blades 59 and 60 are pivoted between their open position wherein they open the perforation 53a and their closing position wherein they close the perforation 53a in response to the direction of current flowing through the coil 67. On the other hand, if the driving arm 73 is driven to pivot by the second actuator 65, then an opening edge of the action hole 61b is pressed by the driving pin 73c. Consequently, the filter blade 61 is pivoted between its open position wherein it opens the perforation 53a and its closing position wherein it closes the perforation 53a in response to the direction of current flowing through the coil 71.

Figure 18:
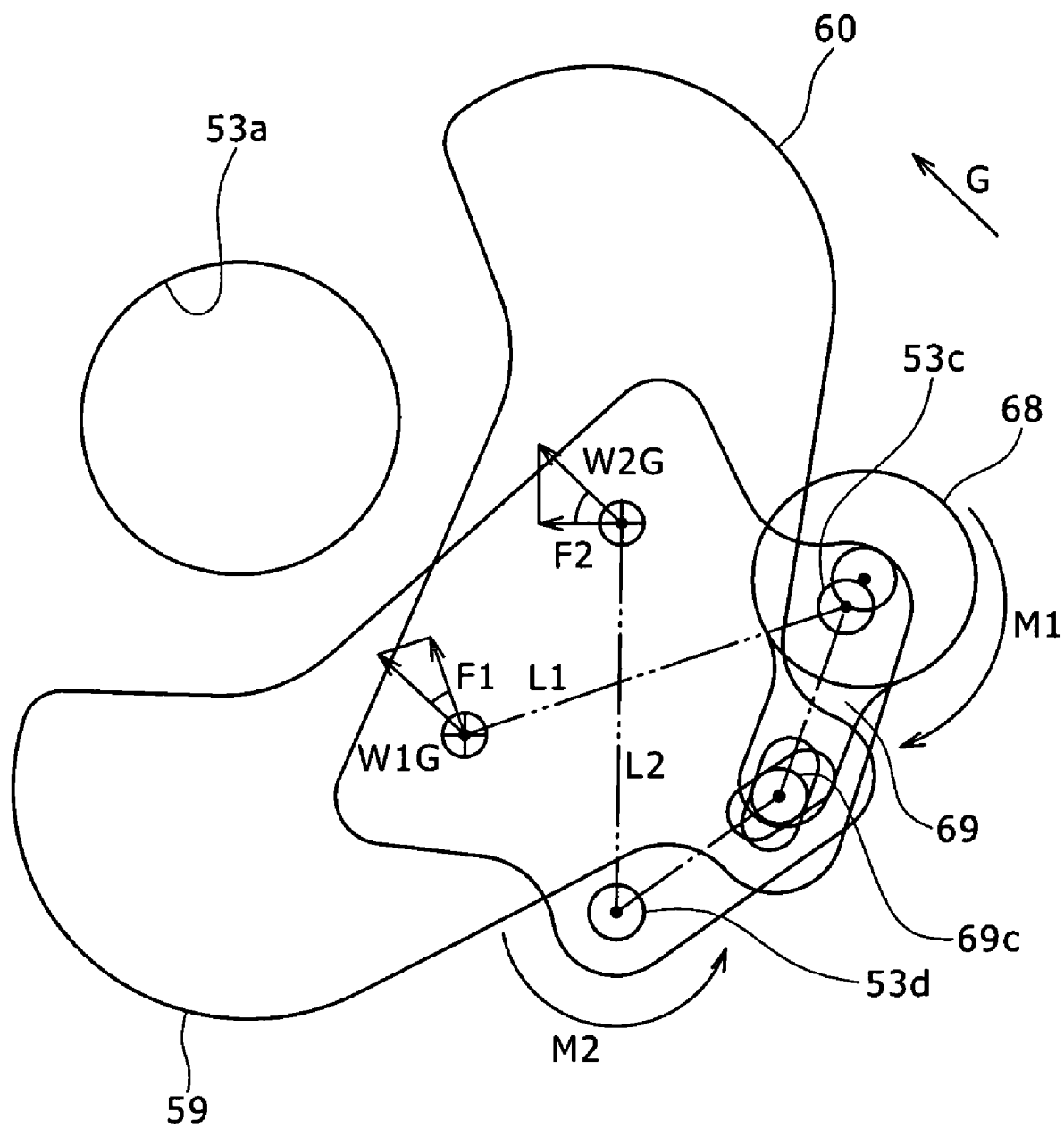
FIG. 18 is a schematic view illustrating force acting upon driving of the shutter blades.

As regards driving of the shutter blades 59 and 60, the shutter blades 59 and 60 are pivoted in the opposite directions to each other by pivotal motion of the driving arm 69 to open or close the perforation 53a as shown in FIG. 18.

If impact force G is generated when the shutter blades 59 and 60 are positioned, for example, at the open position, then a moment M1 is generated in the shutter blade 59 while another moment M2 is generated in the shutter blade 60. If the weight of the shutter blades 59 and 60 is represented by W1 and W2, respectively, then the force acting upon the center of gravity of the shutter blades 59 and 60 is given by W1·G and W2·G, respectively. At this time, where the distance between the center of pivotal motion and the center of gravity of the shutter blade 59 is represented by L1, the distance between the center of pivotal motion and the center of gravity of the shutter blade 60 is represented by L2 and the force components W1·G and W2·G in directions perpendicular to the directions of the distances L1 and L2 are represented by F1 and F2, respectively, the moments M1 and M2 are given by M1=L1·F1 and M2=L2·F2, respectively. Since the directions of the force components F1 and F2 are much different from each other, the force acting upon the driving pin 69c when the impact force G is generated is low when compared with the overall weight of the shutter blades 59 and 60. Accordingly, as regards the shutter blades 59 and 60, the holding force of the core 66 for the magnet 68 when the coil 67 is not energized may be low.

In driving of the filter blade 61, the filter blade 61 is pivoted by pivotal motion of the driving arm 73 to open or close the perforation 53a.

Figure 19:
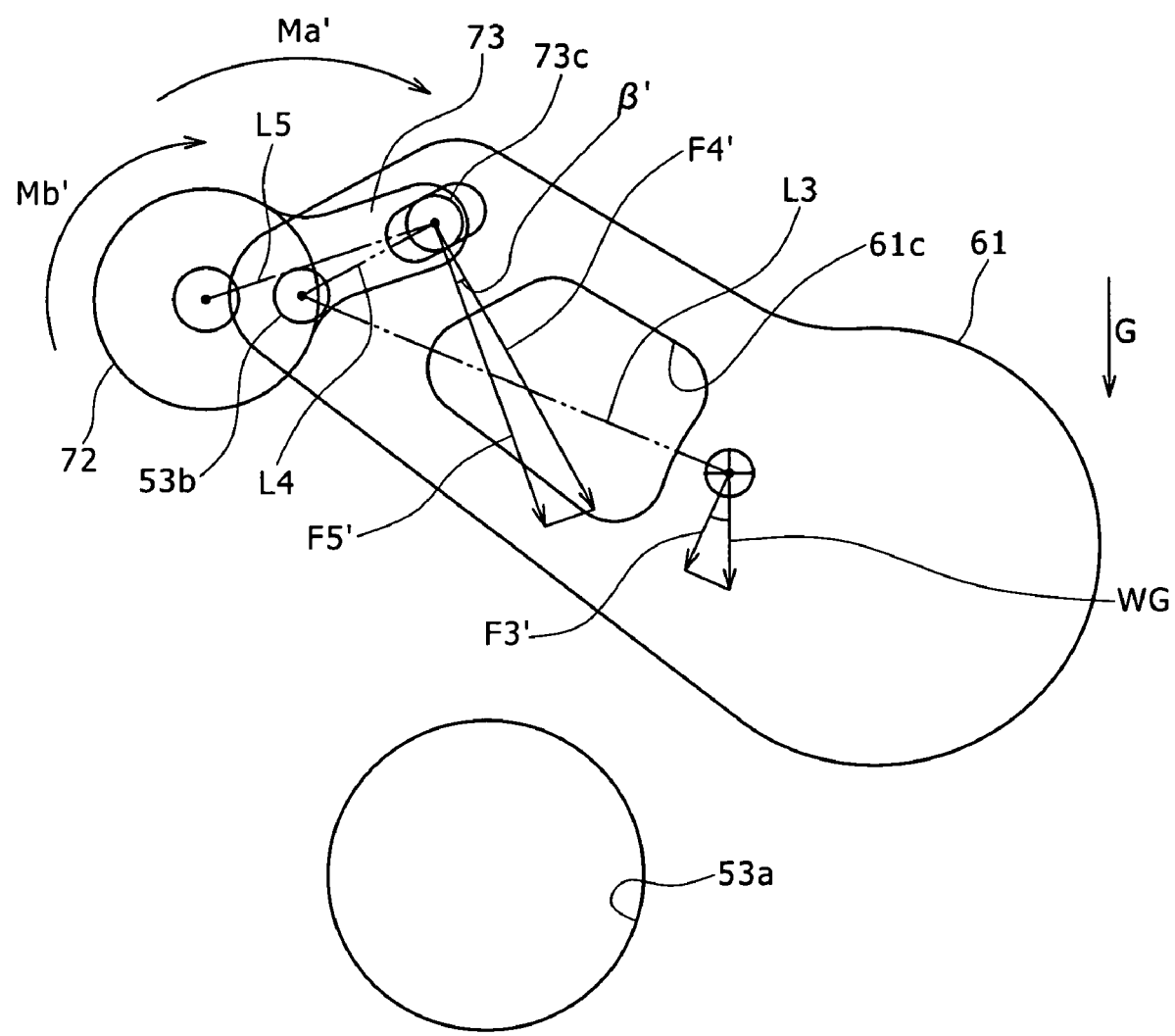
FIG. 19 is a schematic view illustrating force acting upon driving of the filter blade where a filter pivotal motion center shaft is positioned between the center of rotation of a magnet and a driving pin of the actuator.

For example, where the filter pivotal motion center shaft 53b which serves as the center of pivotal motion of the filter blade 61 is positioned between the center of rotation of the magnet 72 and the driving pin 73c as seen in FIG. 19, if impact force G is generated when the filter blade 61 is in its open position, then a moment Ma' is generated in the filter blade 61. Where the weight of the filter blade 61 is represented by W, the force acting upon the center of gravity of the filter blade 61 is given by W·G. At this time, where the distance between the center of pivotal motion and the center of gravity of the filter blade 61 is represented by L3 and the force component of the force W·G in a direction perpendicular to the distance L3 is represented by F3', the moment Ma is given by Ma=L3·F3'.

In this instance, where the distance between the filter pivotal motion center shaft 53b and the driving pin 73c is represented by L4 and the force acting in a direction perpendicular to the distance L4 is represented by F4', the moment Ma' is given by Ma'=L4·F4'.

A moment Mb' is generated in the driving pin 73c. The moment Mb' is given by Mb'=L5·F5' where L5 is the distance between the center of rotation of the magnet 72 and the driving pin 73c, and F5' is the force component of the force F4, in a direction perpendicular to the distance L5.

In this manner, where the filter pivotal motion center shaft 53b is positioned between the center of rotation of the magnet 72 and the driving pin 73c, since the angle β' defined by the force F4' and the force component F5' is small, a moment substantially equal to the moment Ma' which is generated in the filter blade 61 is generated as the moment Mb' in the driving pin 73c. Accordingly, it is necessary to set the holding force of the core 70 for the magnet 72 when the coil 71 is not energized to a high level.

Meanwhile, the image pickup apparatus 1 is configured such that the filter pivotal motion center shaft 53b which serves as the center of pivotal motion of the filter blade 61 is positioned on the opposite side to the center of rotation of the magnet 72 with respect to the driving pin 73c.

Figure 20:
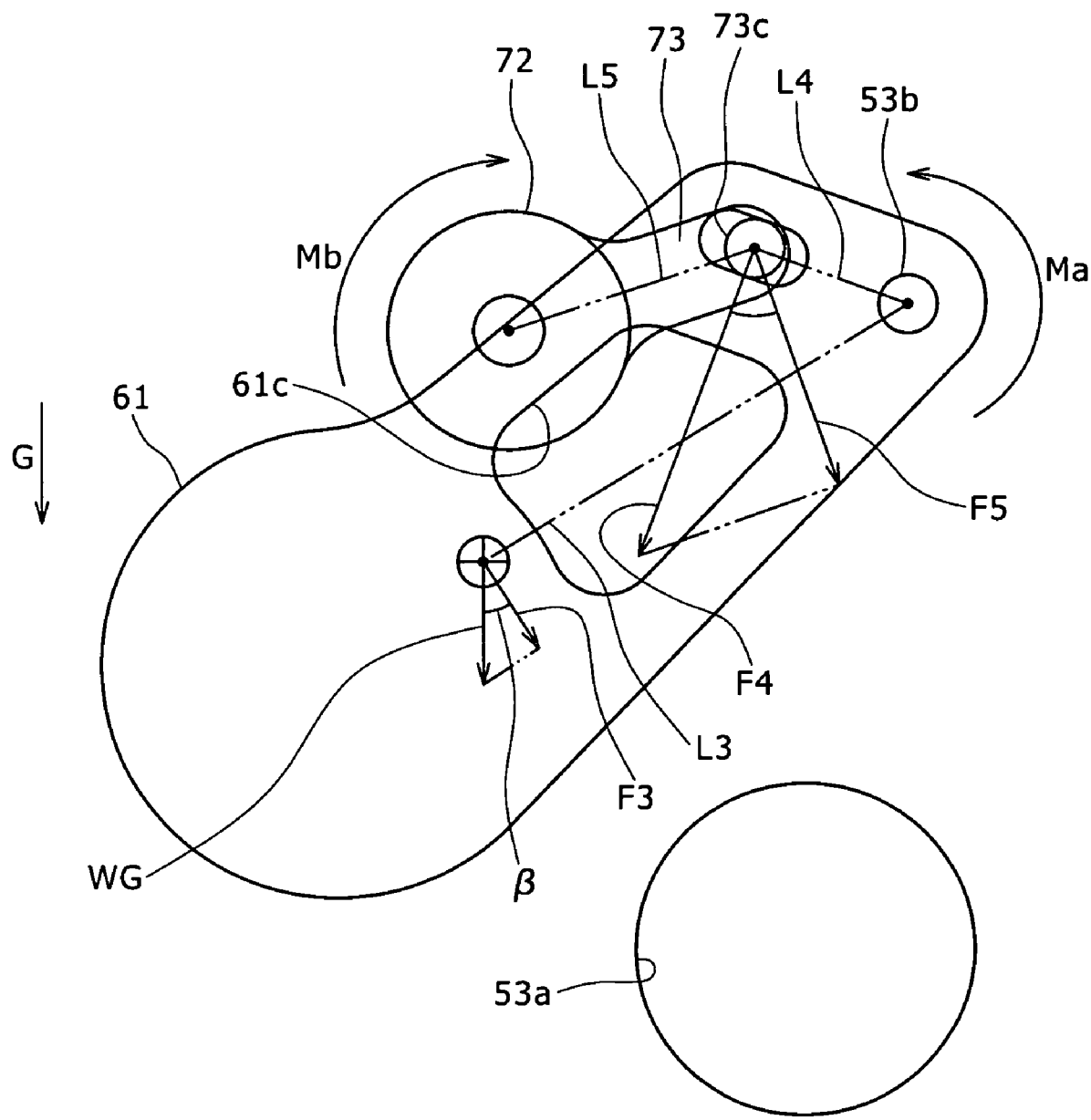
FIG. 20 is a schematic view illustrating force acting upon driving of the filter blade where the filter pivotal motion center shaft is positioned on the opposite side to the center of rotation of the magnet with respect to the driving pin.

In this instance, for example, if impact force G is generated when the filter blade 61 is in its open position as seen in FIG. 20, then a moment Ma is generated in the filter blade 61. If the weight of the filter blade 61 is represented by W, then the force acting upon the center of gravity of the filter blade 61 is given by W·G. At this time, where the distance between the center of pivotal motion and the center of gravity of the filter blade 61 is represented by L3 and the force component of the force W·G in a direction perpendicular to the distance L3 is represented by F3, the moment Ma is given by Ma=L3·F3.

In this instance, where the distance between the filter pivotal motion center shaft 53b and the driving pin 73c is represented by L4 and the force acting in a direction perpendicular to the distance L4 is represented by F4, the moment Ma is given by Ma=L4·F4.

A moment Mb is generated in the driving pin 73c. The moment Mb is given by Mb=L5·F5 where L5 is the distance between the center of rotation of the magnet 72 and the driving pin 73c, and F5 is the force component of the force F4 in a direction perpendicular to the distance L5.

Where the filter pivotal motion center shaft 53b is positioned on the opposite side to the center of rotation of the magnet 72 with respect to the driving pin 73c as in the image pickup apparatus 1, the angle β defined by the force F4 and the force component F5 is great. Therefore, the moment Mb generated in the driving pin 73c is low when compared with the moment Ma generated in the filter blade 61. Accordingly, the holding force of the core 70 for the magnet 72 when the coil 71 is not energized can be set low.

Figure 21:
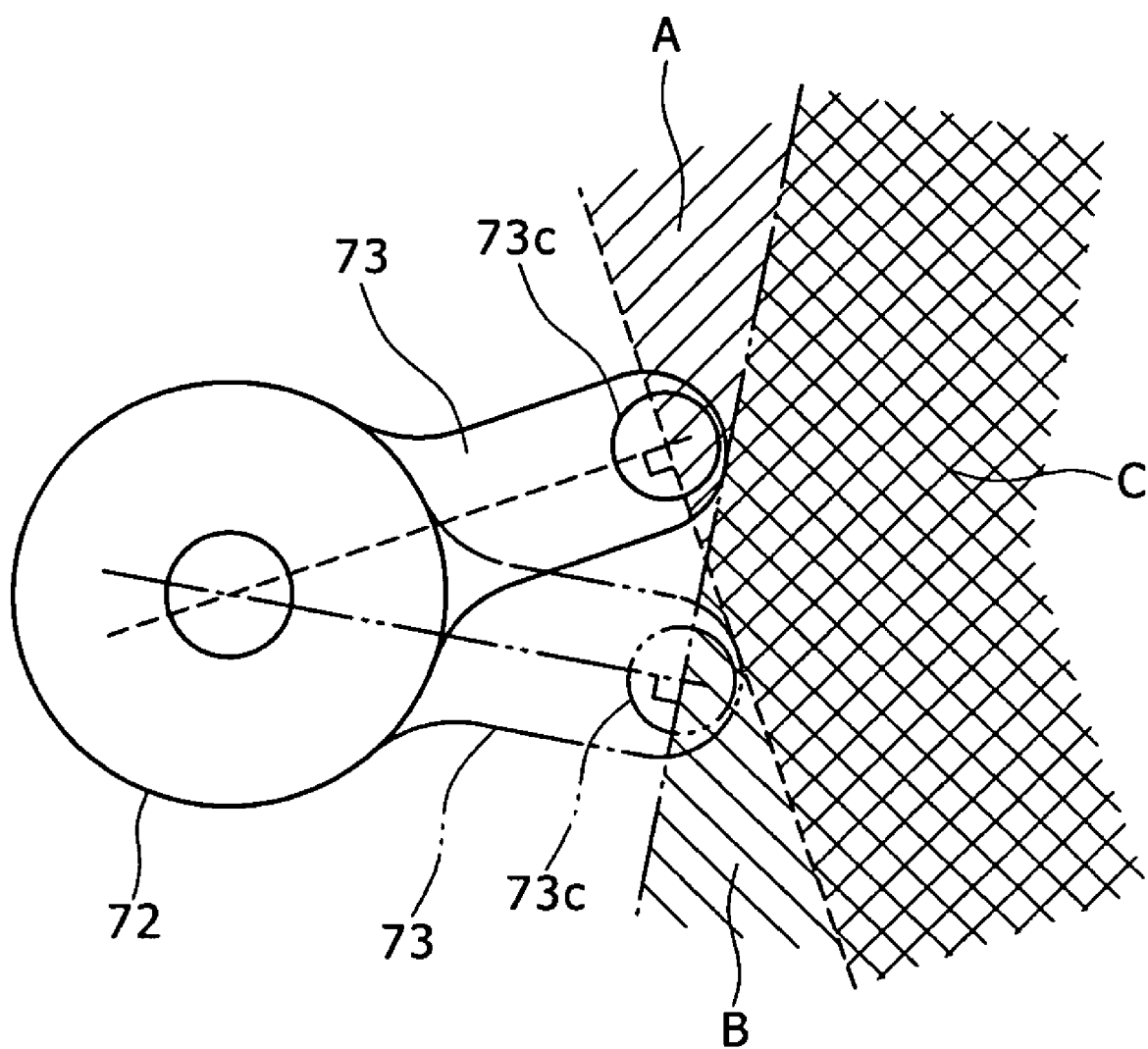
FIG. 21 is a schematic view showing positions at which the filter pivotal motion center shaft is positioned.

In particular, the image pickup apparatus 1 is configured such that the filter pivotal motion center shaft 53b remains positioned on the opposite side to the center of rotation of the magnet 72 with respect to the driving pin 73c over the overall range of the pivotal motion of the filter blade 61 as seen in FIG. 21. More particularly, the image pickup apparatus 1 is configured such that, where, in the open position, the region on the opposite side to the center of rotation of the magnet 72 with respect to the driving pin 73c is represented by a range A and, in the closing position, the range on the opposite side to the center of rotation of the magnet 72 with respect to the driving pin 73c is represented by a range B, the filter pivotal motion center shaft 53b is positioned within a range C within which the range A and the range B overlap with each other.

A wiring line plate 75 is attached to the rear face of the holding plate 74 as seen in FIG. 4. The wiring line plate 75 is connected to the coils 67 and 71 and has a function of supplying power to the coils 67 and 71.

The light amount adjustment apparatus 43 configured in such a manner as described above is attached to the intermediate movable unit 42 with the base member 51 thereof engaged with the base frame 44, and the second movable unit 41 is formed from the intermediate movable unit 42 and the light amount adjustment apparatus 43.

The first movable unit 19 includes a movable frame 76 and a lens group 77 held on the movable frame 76 as seen in FIGS. 4 and 6. The lens group 77 is attached to a central portion of the movable frame 76 through a lens holder 78.

The first movable unit 19 is supported at the movable frame 76 thereof for sliding motion on the guide projections 39 of the straightforward guide 37 and supported for sliding motion on the cam cylinder 18. Accordingly, the first movable unit 19 is moved in the forward or backward direction, that is, in a direction of the optical axis, under the guidance of the straightforward guide 37 by rotation of the cam cylinder 18.

A lens barrier 79 is attached to the front face side of the first movable unit 19 as seen in FIGS. 4 and 6.

In a state wherein the lens barrier 79 is attached to the first movable unit 19, an ornamental ring 80 is attached to the outer face side of the movable frame 76 and the lens barrier 79.

As described above, in the image pickup apparatus 1, the hole 61c or a cutaway portion is formed on the filter blade 61 to reduce the weight of the filter blade 61. Accordingly, with regard to the shutter blades 59 and 60 which may require reduction of the holding force when the coil 67 is not energized in order to achieve reduction of the power consumption upon starting and increase of the shutter speed and the filter blade 61 which has a comparatively high weight and may require increase of the holding force in order to achieve stability of the holding state when the coil 67 is not energized, the holding force for the filter blade 61 when the coil 67 is not energized can be reduced by the reduction of the weight of the filter blade 61 and common use of parts of the first actuator 64 and the second actuator 65 can be anticipated. As a result, reduction of the fabrication cost and improvement of the assemblability can be anticipated.

Further, since the image pickup apparatus 1 is configured such that the filter pivotal motion center shaft 53b remains positioned on the opposite side to the center of rotation of the magnet 72 with respect to the driving pin 73c over the overall range of the pivotal motion of the filter blade 61 as seen in FIG. 21, the holding force for the filter blade 61 when the coil 71 is not energized can be reduced. Consequently, common use of parts of the first actuator 64 and the second actuator 65 can be anticipated, and reduction of the fabrication cost and improvement of the assemblability as much can be anticipated.

While a preferred embodiment of the present invention has been described using specific terms, such description is for illustrative purpose only, and it is to be understood that changes and variations may be made without departing from the spirit or scope of the following claims.

What is claimed is:

1. A light amount adjustment apparatus, comprising:
a shutter blade and a filter blade each configured to operate in a predetermined direction to adjust the amount of light transmitted through a lens group;
a first magnet configured to drive said shutter blade;
a first core and a first coil;
a second magnet configured to drive said filter blade; and
a second core and a second coil;
said filter blade having a control portion for controlling and adjusting the amount of light transmitted through said lens group; and
said filter blade having at least one hole or one cutaway portion formed at a portion of said filter blade other than said control portion,
the second magnet and second coil not overlapping when viewed from a direction substantially perpendicular to the filter blade.

2. The light amount adjustment apparatus according to claim 1, wherein said second magnet is formed as a disk and supported for rotation in a circumferential direction;
said filter blade being supported for pivotal motion to adjust the amount of light;
said light amount adjustment apparatus further comprising a driving arm connected for pivotal motion by rotation of said second magnet and having a driving pin connected to said filter blade for pivoting said filter blade; and
the center of pivotal motion of said filter blade being positioned on the opposite side to the center of rotation of said second magnet with respect to said driving pin over an overall range of the pivotal motion of said filter blade from a line segment perpendicular to a line segment interconnecting the center of rotation of said second magnet and said driving pin on a plane within which said filter blade is pivoted.

3. An image pickup apparatus, comprising:
a lens barrel having a predetermined lens group disposed inside;
an apparatus body configured to support said lens barrel; and
a light amount adjustment apparatus incorporated in said lens barrel and configured to adjust the amount of light fetched through said lens group;
said light amount adjustment apparatus including
a shutter blade configured to be operated in a predetermined direction by a first actuator, which includes a first magnet, a first core and a first coil, to adjust the amount of light transmitted through said lens group, and
a filter blade configured to be operated in a predetermined direction by a second actuator, which includes a second magnet, a second core and a second coil, to adjust the amount of the light transmitted through said lens group,
said filter blade having a control portion for controlling and adjusting the amount of the light transmitted through said lens group, and
said filter blade having at least one hole or one cutaway portion formed at a portion of said filter blade other than said control portion,
the second magnet and second coil not overlapping when viewed from a direction substantially perpendicular to the filter blade.

4. A light amount adjustment apparatus, comprising:
a shutter blade and a filter blade each configured to operate in a predetermined direction to adjust the amount of light transmitted through a lens group;
a first magnet configured to drive said shutter blade;
a first core and a first coil;

a second magnet configured to drive said filter blade; and
a second core and a second coil;
said second magnet being formed as a disk and supported for rotation in a circumferential direction;
said filter blade being supported for pivotal motion to adjust the amount of light;
said light amount adjustment apparatus further including a driving arm connected for pivotal motion by rotation of said second magnet and having a driving pin connected to said filter blade for pivoting said filter blade; and
the center of pivotal motion of said filter blade being positioned on the opposite side to the center of rotation of said second magnet with respect to said driving pin over an overall range of the pivotal motion of said filter blade from a line segment perpendicular to a line segment interconnecting the center of rotation of said second magnet and said driving pin on a plane within which said filter blade is pivoted,
the second magnet and second coil not overlapping when viewed from a direction substantially perpendicular to the filter blade.

5. The light amount adjustment apparatus according to claim 4, wherein said filter blade has a control portion which controls and adjusts the amount of light transmitted through said lens group, and said filter blade has at least one hole or one cutaway portion formed at a portion of said filter blade other than said control portion.

6. An image pickup apparatus, comprising:
a lens barrel having a predetermined lens group disposed inside;
an apparatus body configured to support said lens barrel; and
a light amount adjustment apparatus incorporated in said lens barrel and configured to adjust the amount of light fetched through said lens group;
said light amount adjustment apparatus including
a shutter blade configured to be operated in a predetermined direction by a first actuator, which includes a first magnet, a first core and a first coil, to adjust the amount of light transmitted through said lens group, and
a filter blade configured to be operated in a predetermined direction by a second actuator, which includes a second magnet, a second core and a second coil, to adjust the amount of the light transmitted through said lens group,
said second magnet being formed as a disk and supported for rotation in a circumferential direction,
said filter blade being supported for pivotal motion to adjust the amount of light,
said light amount adjustment apparatus further having a driving arm connected for pivotal motion by rotation of said second magnet and having a driving pin connected to said filter blade for pivoting said filter blade, and
the center of pivotal motion of said filter blade being positioned on the opposite side to the center of rotation of said second magnet with respect to said driving pin over an overall range of the pivotal motion of said filter blade from a line segment perpendicular to a line segment interconnecting the center of rotation of said second magnet and said driving pin on a plane within which said filter blade is pivoted,
the second magnet and second coil not overlapping when viewed from a direction substantially perpendicular to the filter blade.

* * * * *